United States Patent
Kriplani et al.

(10) Patent No.: US 7,353,203 B1
(45) Date of Patent: Apr. 1, 2008

(54) SYSTEM AND METHOD FOR INVOICE CONFIRMATION AND FUNDING

(75) Inventors: Sanjeev Indru Kriplani, Mountain View, CA (US); Eric Raymond, Palo Alto, CA (US)

(73) Assignee: Inzap, Inc., Mountain View, CA (US)

( * ) Notice: Subject to any disclaimer, the term of this patent is extended or adjusted under 35 U.S.C. 154(b) by 1492 days.

(21) Appl. No.: 09/714,898

(22) Filed: Nov. 15, 2000

Related U.S. Application Data

(60) Provisional application No. 60/167,449, filed on Nov. 23, 1999.

(51) Int. Cl.
*G06Q 40/00* (2006.01)

(52) U.S. Cl. .......................................... 705/39

(58) Field of Classification Search ............ 705/35–45, 705/7, 8
See application file for complete search history.

(56) References Cited

U.S. PATENT DOCUMENTS

| | | | |
|---|---|---|---|
| 5,694,552 A * | 12/1997 | Aharoni ..................... | 705/37 |
| 5,920,847 A | 7/1999 | Kolling et al. | |
| 6,070,150 A | 5/2000 | Remington et al. | |
| 6,092,053 A | 7/2000 | Boesch et al. | |
| 6,167,385 A * | 12/2000 | Hartley-Urquhart | |
| 2002/0062282 A1 * | 5/2002 | Kight et al. ................... | 705/40 |

OTHER PUBLICATIONS

Not Getting Paid? There are ways to speed up the payment process, Air Conditioning News, Troy 1999, vol. 208. Iss 15, p. 1-2.*
Luhby, Tami; "Fast Financing for Impulse Buys"; Crains New York Business; Feb. 8, 1999; p. 15; New York, New York, USA.
"B-to-B Payment System Goes Online"; Financial NetNews; Apr. 17, 2000; p. 6; vol. V, No. 16; USA.
"Business Turn to Internet as An Outlet for Quick Bill Payment"; Star-Ledger; Jun. 19, 2000; Newark, New Jersey, USA.
"Merchants Grapple With Payment Options—Integration still a hurdle as credit-card alternatives emerge"; Internet Week; May 22, 2000; p. 14; USA.
"Importer Eliminates Open Account Receivables"; Body Fashions Intimate Apparel; Feb. 1994; p. 6-mm; vol. 22, No. 2; USA.
Waltner, Charles; "B-to-B E-Payment Offers Benefits to Marketplaces"; Information Week; Nov. 13, 2000; 228(4) pages; vol. 812.

(Continued)

*Primary Examiner*—R Weisberger
(74) *Attorney, Agent, or Firm*—Blakely, Sokoloff, Taylor & Zafman LLP

(57) ABSTRACT

A system and method are disclosed for billers and payers to manage accounts receivable for business-to-business payments using a third-party intermediary. The system enables billers to be paid faster and payers to delay payment, while also minimizing the risk of default to the intermediary. The advantages of the present system and method stem from direct authorization by the payer to the intermediary, a nonrepudiable commitment by the payer, and dual recourse for the third-party intermediary, without the need for explicit payment contracts between billers and payers.

19 Claims, 19 Drawing Sheets

OTHER PUBLICATIONS

Waltner, Charles; "Time to Exchange Money: Online Billing is Now a Must for the B2Bs . . . "; InternetWeek; Nov. 20, 2000; 67(2) pages; Vol. 838.

Waltner, Charles; "Online Billing—Time To Exchange Money—Online Billing is Now a Must For the B2Bs—Which is Why the Race is on to Deliver a Comprehensive System"; InternetWeek; Nov. 20, 2000; p. 67.

"Biz-To-Biz Buzz Apr. 3, 2000"; Newsbytes PM; Apr. 3, 2000; Washington, D.C., USA.

Clark, Philip B.; "Payment Options Proliferate Online"; B to B; Sep. 11, 2000; p. 36; vol. 85, No. 14.

"Alternative Financing Eases Cash Flow"; Canadian Plastics; May 1, 2000; pp. 48-49; vol. 58, No. 5.

Decarlo, Scott; "The Hot Ones"; Forbes; Nov. 1, 1999; pp. 284-286; vol. 164, No. 11; USA.

Hoffman, Thomas; "Business-to-Business Lender Foresees Fast Growth Online"; Computerworld; Oct. 11, 1999; pp. 44; vol. 33, No. 41; USA.

"AmWorld Commerce Launches Financing Plan for Small Firms"; Daily News Record; Oct. 12, 1994; pp. 6.

"Actrade and Clarus Partner to Meet Demand for Comprehensive Online Trading Services"; PR Newswire; Dec. 5, 2000.

"Summit Bancorp Renews Actrade Financial Technologies' Credit Facility"; PR Newswire; Dec. 4, 2000; New York, USA.

"Actrade and TRADEPAQ Partner to Offer Comprehensive Suite of E-Fulfillment Solutions to Complete Online Global Trade Transactions"; PR Newswire; Nov. 20, 2000; Somerset, New Jersey, USA.

"TRADEPAQ Partners with Actrade to Offer Comprehensive Suite of e-fulfillment Solutions for Completion of Online Global Trade Transactions"; Business Wire; Nov. 20, 2000; pp. 2360; New York, USA.

"Actrade's Online Credit, Payment and Settlement Technology Solution Reduces Fraud"; PR Newswire; Aug. 21, 2000; New York, USA.

"First Quarter Fiscal 2001 Reflects Strong Earnings Total Revenue up 86%; Net up 95%; EPS up 59%"; PR Newswire; Oct. 31, 2000; New York, USA.

"Actrade to Hold First Quarter Fiscal 2001 Earnings Conference Call"; PR Newswire; Oct. 25, 2000; New York, USA.

"Fiscal Year-End 2000 Reflects Record-Setting Earnings Total Revenues Up 93%; Net Income Up 81%; EPS Up 73%"; PR Newswire; Sep. 28, 2000; New York, USA.

"American International Petroleum Secures Aggregate $15 Million in Financings; Funds to be Utilized Primarily for Year 2000 Drilling Programs on Kazakhstan Licenses"; Business Wire; Jul. 20, 2000; New York, USA.

"Strong Demand for Actrade's TAD Program Prompts Summit Bank to Increase Credit Facility to $20 Million"; PR Newswire; Jun. 15, 2000; Somerset, New Jersey, USA.

"ContractorHub.com Chooses NetFish to Provide XML Foundation; Joint Agreement to Enable Seamless Business Process Integration for the Construction Industry"; Business Wire; Jun. 7, 2000; pp. 1262; Washington, USA.

"Robinson-Humphrey's Internet Payment & Transaction Processing Conference to Showcase Market-Leading Companies"; PR Newswire; May 25, 2000; pp. 7441; Atlanta; USA.

"Castle Advisors Research Update for Actrade"; PR Newswire; May 17, 2000; pp. 5288; Freeport, New York, USA.

"Actrade Launches Buyer Incentive Program for Large Multi-National Companies"; PR Newswire; May 16, 2000; Somerset, New Jersey, USA.

"Record Setting Demand for Actrade's Tad Program; Third Quarter Results Exceed Estimates—Gross Profit Up 132%; Net Income Up 132%; EPS Up 119%-"; PR Newswire; May 11, 2000; New York, USA.

"Clayton Williams Energy, Actrade International, GukfMark Offshore, Total Renal Care Holdings and Billserv.com Conference Calls to be Broadcast on Investor Broadcast Network Over the Internet"; Business Wire; May 9, 2000; pp. 1978; Philadelphia, USA.

"Actrade Capital, Inc. and ContractorHub.com AnnounceStrategic Partnership to Provide B2B Payment Solution for the Construction Industry"; PR Newswire; Apr. 3, 2000; Somerset, New Jersey, USA.

"ProNetLink.Com Forms Strategic Alliance With Chinese Internet Company"; PR Newswire; Apr. 7, 2000; pp. 8834; New York, USA.

"Actrade(TM) Payment Module Up and Running on ProNetLink.com(TM); Today's Launch Allows Unsecured Credit for On-Line B2B Transactions"; PR Newswire; Apr. 7, 2000; pp. 2186; New York, USA.

Actrade Payment Solution Up and Running On ProNetLink.com (TM); Today's Launch Facilitates On-Line B2B Transactions; PR Newswire; Apr. 7, 2000; pp. 2184; Somerset, New Jersey, USA.

"ProNetLink.com Signs Strategic Alliance With Leading Translation Company"; Business Wire; Mar. 30, 2000; pp. 1206; New York, USA.

"ProNetLink Will Produce Live Video Investor Q&A on Mar. 16; Management Will Discuss Current Company Events and Take Questions From Investors Over The Internet"; Business Wire; Mar. 14, 2000; pp. 1069; New York, USA.

"S1 Corporation, Stephan Company, Actrade International, VICORP Resturants and Whole Foods Market Conference Calls to be Broadcast by Investor Broadcast Network Over the Internet"; Business Wire; Feb. 11, 2000; p. 1470; Philadelphia, USA.

"Stockgroup.com Announces Corinthian Partners Asset Management Chair is This Week's Guest on Smallcapcenter.com's Webcast"; Business Wire; Feb. 2, 2000; p. 0244; New York, USA.

"ProNetLink.com and Actrade International, Ltd. Sign Agreement to Provide Acceptance Drafts for Online B-To-B Transactions"; PR Newswire; Jan. 25, 2000; p. 9172; New York, USA.

"Actrade Capital, Inc. and ProNetLink.com Announces Partnership to Facilitate Online B-To-B Transactions"; PR Newswire; Jan. 25, 2000; p. 9165; Somerset, New Jersey, USA.

"Castle Advisors Release of a Research Report for Actrade International, Ltd."; PR Newswire; Nov. 9, 1999; p. 0416; Freeport, New York, USA.

"Actrade Announces Record Breaking Fourth Quarter Financial Results; Gross Sales Up 138%; Net Income up 82%; EPS up 80%"; PR Newswire; Oct. 4, 1999; pp. 8474; New York, USA.

Actrade Names New President and CFO NY/NJ Financial Services Corp Positions for Major Growth Spiral; PR Newswire; Sep. 21, 1999; p. 9772; New York, USA.

"Actrade Makes Fortune's List of Top Growth Companies; NJ Financial Services Firm a National Leader"; PR Newswire; Sep. 7, 1999; p. 2350; Somerset, New Jersey, USA.

"Actrade Announces Enegagment of Investment Banker"; PR Newswire; Jun. 2, 1999; New York, USA.

"Actrade Announces Record Breaking Third Quarter Financial Results; Sales Up 107%; Net Income up 47%"; PR Newswire; May 11, 1999; New York, USA.

"Actrade Capital, Inc.; Opens Corporate Headquarters in New Jersey"; PR Newswire; Apr. 6, 1999; New York, USA.

"Acquisition Capability Reports Initial Results of Newly Formed Commercial and Industrial Air Conditioning and Refrigeration Division"; PR Newswire; Oct. 21, 1991.

"Acquisition Capability Acquires Two New York Corporations"; PR Newswire; Sep. 16, 1988.

"Alexander Stonkus—Actrade Financial Technologies Ltd"; Wall Street Transcript Digest; Oct. 30, 2000.

"Alternative Financing Eases Cash Flow"; Canadian Plastics; May 1, 2000; pp. 48(2).

Lane, Amy; "Edison Powers Up Online Bill Payment"; Crain'Detroit Business; Sep. 4, 2000; pp. 3; vol. 16, No. 36; Lansing, Michigan, USA.

"CheckFree Announces Amendment to TransPoint Merger Agreement"; PR Newswire; May 5, 2000; pp. 1; Atlanta, Georgia, USA.

"CheckFree Gains Upper Hand Over Banks with Aquistion of TransPoint; High-Tech Company Enhances Position in EBPP Marketplace"; Business Wire; Feb. 23, 2000; pp. 1; Palo Alto, California, USA.

Fitch, Jessica Madore; "Eletronic Bill Providers Joining Forces"; Chicago Sun Times; Feb. 17, 2000; pp. 55.

Clothier, Mark; CheckFree Net Billing Now On Top Stock Rises: Deal to Buy Competitor TransPoint Gives Norcross Company Dominance; Atlanta Constitution; Feb. 17, 2000; pp. (D; 3).
"CheckFree, Transpoint Union Close"; Credit Union Journal; Sep. 11, 2000; p. 17; vol. IV, No. 37; USA.
"Loss at CheckFree is Less than Predicted"; American Banker; Aug. 10, 2000; p. 13; vol. 165, No. 152; USA.
"In Brief: Transpoint Signs Sallie, BellSouth"; American Banker; May 22, 2000; p. 15; vol. 165, No. 98; Englewood, Colorado, USA.
"BofA to Take a 16% Stake in CheckFree"; Wall Street Journal; Apr. 27, 2000; p. A3; vol. CCXXXV, No. 84; USA.
"The Pieces Come Together in EBPP"; US Banker; Mar. 2000; p. 24; vol. 110, No. 3; USA.
"Alabama Bank Launches Bill Pay With Transpoint"; Financial NetNews; Feb. 21, 2000; p. 5; vol. V, No. 8; USA.
Chris Costanzo; "Electronic Billing Is Still Beyond the Mainstream—But for How Long?"; American Banker; Mar. 9, 2000; p. 3A; vol. 165, No. 47; USA.
"M'soft Exits E-Billing"; Client Server News; Feb. 21, 2000; USA.
Nelson, Matthew G.; "CheckFree To Acquire Chief Online Billing Rival — Combined Company Promises New Products And Services, Improved Compatibility"; Information Week; Feb. 21, 2000; p. 38; USA.
Marjanovic, Steven; "CheckFree Deal Seen as Costly Coup in E-Billing"; American Banker; Feb. 22, 2000; p. 18; vol. 165, No. 35; USA.
"OR 183-22 TransPoint Launches E-Bill Upgrade"; Online Reporter; Feb. 7, 2000; USA.
Marjanovic, Steven; "CheckFree Challenges Bank with Merger Deal"; Feb. 7, 2000; p. 1; vol. 165, No. 33; USA.
Snel, Ross; "Transpoint Moves Closer To CheckFree Weight Class"; American Banker, Feb. 3, 2000; p. 10; vol. 165, No. 23; USA.
"E-Billing Gains Steam In Corporate Payments Space"; Corporate EFT Report; Dec. 20, 2000; vol. 20. No. 25.
"Chase Manhattan Marshals Billers"; Bank System + Technology; Jan. 1, 1999; p. 9; vol. 36, No. 1.
"First Union Takes Dual Approach"; Banks Systems + Technology; Jan. 1, 1999; p. 9; vol. 36, No. 1.
"Contingent of Big Banks Proposes Utility To Assemble Industry-Controlled Biller Base"; Bank Systems + Technology; Jan. 1, 1999; p. 8; vol. 36, No. 1.
"CheckFree and Transpoint Close Merger"; Retail Delivery News; Sep. 13, 2000; vol 5, No. 19.
Kistner, Toni; "Goodbye Paper Checks?"; Home Office Computing; May 1, 1999; vol. 17, No. 5.
"Sounding off: A Call for Divergence: With its 1$ billion purchase of TransPoint, CheckFree is building an e-billing monopoly"; Bank Technology News; Mar. 1, 2000; pp. 74; vol 13, No. 3.
"Bank Technology News / Mar. 2000"; Bank Technology News; Mar. 1, 2000; pp. 1; vol. 13, No. 3.
O Sullivan, Orla; "Transpoint Says "Pay Anyone" is Live"; Bank Technology News; Feb. 1, 2000; p. 4; vol. 13, No. 2.
Redman, Russell; "Market Potential"; Bank Systems + Technology; Apr. 1, 2000; p. 8; vol. 37, No. 4.
Patel, Jeetu; "The Check Isn't In The Mail—With its recent acquisitions of TransPoint and BlueGill CheckFree has livened up a stalled market"; Information Week; Mar. 27, 2000; p. 224.
Schaff, William; "CheckFree Seeks Merger Payoff—The Company's Acquisition of TransPoint Would Make it the Market Leader in Electronic Bill Payment and Presentment, if the Justice Department Gives its OK"; Information Week; Mar. 20, 2000; pp. 146.
"CheckFree-Transport Merger Rocks Landscape"; Retail Delivery News; Feb. 29, 2000; vol. 5, No. 5.
"CheckFree in $1bn Merger With Microsoft's TransPoint Feb. 16, 2000"; Newsbytes; Feb. 16, 2000; Redmond, Washington, USA.
Joyce, Erin, et al., "Beauty Is In The Eye Of The Beholder. CheckFree Pays Up For TransPoint"; USBanker; Mar. 1, 2000; pp. S10; vol. 110, No. 3.
O Sullivan, Orla; "The Pieces Come Together In EBPP"; USBanker; Mar. 1, 2000; pp. 24; vol. 11, No. 3.

Trombly, Maria; "Electronic Billing Merger Should Benefit Billers, Banks"; Computerworld; Feb. 21, 2000; pp. 12; vol. 34, No. 8; USA.
Bielski, Lauren; "Bill Presentment Poised for Mainstreaming"; ABA Banking Journal; Nov. 11, 1999; pp. 7, vol. 91, No. 11.
Smith, Claire Furia; "Paytrust: An Online Secretary"; Philly Tech; May 1, 1999; pp. 22-24; vol. 2, No. 5.
"TransPoint Banks On Name Change, String of Deals"; PC Week; pp. 25, 28; vol. 15 No. 45.
Miller, Dan; "View Bills With A Browser, Pay With A Click"; PC World; p. 68; vol. 16, No. 12, USA.
"EBP&P: CheckFree Wins Battle. War Rages On"; Future Banker; Jan. 1 2000; pp. 12S; vol. 4, No. 3.
"Buying Into Online Billing"; PC Magazine; Mar. 7, 2000; pp. 94.
"More Than 14 Million BellSouth Customers Can Pay E-Bills Today Through The TransPoint Online Bill Payment Service"; PR Newswire; Jul. 24, 2000.
TransPoint Online Payment Service Now Available on Prodigy and Go2Net Network; PR Newswire; Jun. 27, 2000.
"GE Capital Presents TransPoint E-Bills to Card Services Clients"; PR Newswire; Apr. 7, 2000; p. 9110.
"TransPoint Will Team With Intuit to Bring Comprehensive E-Bills Offering to More Than 50 Million Online Customers"; Business Wire; Feb. 2, 2002; pp. 1398.
"eBills Service Provider TransPoint to Deploy Web Data Publishing Solution From Actuate"; Business Wire; Jan 12, 2000; pp. 1080; San Mateo, California, USA.
"TransPoint and Interface Systems Form Alliance to Speed Companies to Market With E-Bills"; PR Newswire; Nov. 22, 1999; pp. 0542; Ann Arbor, Mighigan, USA.
"TransPoint Expands Global Reach With Agreement to Develop Electronic Bill Payment and Presentment Service for Australia Post"; PR Newswire; Oct. 27, 1999; pp. 0104; Englewood, Colorado, USA.
"TransPoint and M&I Data Services Enter Agreement to Deliver Complete Internet Bill Delivery and Payment Solution for Finanical Institutions"; PR Newswire; Oct. 11, 1999; pp. 3702.
"Major Telecommunications, Oil and Utility Companies Embrace TransPoint, Bringing the Convenience of Internet Bill Delivery and Payment to Tens of Millions of Customers"; PR Newswire; Oct. 4, 1999; pp. 8365 Englewood, Colorado, USA.
"AccuDocs Supports TransPoint's E-bill Delivery and Payment"; PR Newswire; Sep. 17, 1999; pp. 7681; Birmingham, Alabama, USA.
"BlueGill Technologies Introduces Integrated Solution for TransPoint Billers"; PR Newswire; Sep. 13, 1999; pp. 6262; Ann Arbor, Michigan, USA.
"One of California's Largest Water Utilities Taps TransPoint E-Bills"; PR Newswire; Sep. 8, 1999; pp. 3187; Englewood, Colorado, USA.
"Top Home-Banking Solution Providers Join TransPoint Technology Associate Program"; PR Newswire; Dec. 1, 1998; Englewood, Colorado, USA.
"Con Edison Teams With Microsoft and First Data for Online Billing-Service Joins Other Successful E-Bill Options for Con Edison Customers"; PR Newswire; Oct. 15, 1998; New York, USA.
O Sullivan, Orla; "The Jostling for E-Bill Supremacy"; Bank Technology News; Dec. 1, 1999; pp. ITEM0004100C; American Banker-Bond Buyer.
Kelsey, Dick; "Microsoft's Transpoint Launches "Pay Anyone" System Feb. 1, 2000"; Newsbytes PM; Feb. 1, 2000; Newsbytes News Network; Englewood, Colorado, USA.
"E-Bill Battle"; Bank Technology News; Sep. 1, 1999; pp. ITEM9927000E; Faulkner & Gray, Inc.; USA.
Costanzo, Chris; "Banks Wary About New Bill-Payment Demands"; American Banker; Jan. 27, 1999; vol. 164, No. 17.
Marjanovic, Steven; "Checkfree Seen Staying Ahead of Rival"; American Banker; Sep. 21, 1998; pp. p20(1); vol.163, No. 188.
Hiestand, Jesse; L.A. Ad Agencies Merger Asher/Gal & Partners to be Second-Largest Independent; Daily News; Jul. 25, 2000; pp. B1.
McKnight, Marshall; "Who's Hot, Who's Not Among Tech Stocks"; Business News New Jersey; Nov. 7, 2000; pp. 6; vol 13, No. 45.

"Interview: Andy Zimmerman on how fresh ideas turn into real, live Internet-releated companies at idealab!"; Business News New Jersey; Sep. 26, 2000; pp. 19; vol. 13, No. 39.
"Paytrust and PayMyBills.com Finalize Merger"; Business Wire; Oct. 4, 2000; pp. 1.
Sabatini, Patricia; "PNC Customers Can Go Paper-Free Each Month"; Pittsburgh Post—Gazette; Sep. 21, 2000; pp. F-3.
"SF Interactive Names James Waldrop as CTO"; PR Newswire; May 18, 2000; pp. 1.
"PC Magazine Names Tim Castelli New Publisher"; PR Newswire; May 17, 2000; pp. 1.
Turner, James; "Letting the Web Pay Your Bills"; Christian Science Monitor; Jan. 18, 2000; pp. 19.
Bongiorni, Sara; "Banks Working To Help Customers bypass Paper Bills"; Greater Baton Rouge Business Report; Oct. 26, 1999; p. A8.
"Former Senior Executive of DIRECTV and Walt Disney Appointed as New Cheif Technology Officer for PayMyBills.com"; Business Wire; Oct. 5, 1999; p. 1.
Hisey, Pete; "Outclicked in the Online Billing Wars"; Credit Card Management; Mar. 2000; pp. 26-30; vol. 12, No. 12; Faulkner & Gray, Inc.; USA.
"Will Merger Pay Off For Bill Payers?"; Finanical Service ONLINE; Oct. 2000; p. 8; vol. 5, No. 10; USA.
"Paytrust Pays Out For PayMyBills.com"; Electronic Payments International; Aug. 31, 2000; p. 3; IRELAND.
Rosen, Cheryl; "Paytrust To Buy PayMyBills.com"; Information Week; Aug. 28, 2000; p. 141; USA.
"Paytrust Snaps Up PayMyBills.com"; Newsbytes News Network; Aug. 24, 2000; Lawernceville, New Jersey, USA.
"Paytrust, PayMyBills.com Join Forces"; USA Today; Aug. 23, 2000; vol. 18, No. 242; USA.
"Web Start-Ups Outstrip Banks In E-Payments"; American Banker; Jun. 14, 2000; p. 1; vol. 165, No. 114; USA.
"OR 193-05 PayMyBills.com to Acquire payMe.com"; Online Reporter; Apr. 17, 2000; USA.
"Digest: Personalised Bills"; Customer Loyalty Today; Mar. 2000; p. 5; United Kingdom.
Rao, Raga; "OR 181-01 Are E-Bill Services Gonna Be Free?"; Online Reporter; Jan. 24, 2000; USA.
Iversen, Wesley R.; "Putting Paper Bills On Web Sites"; Financial Service ONLINE; Sep. 1, 1999; USA.
"PayMyBills.com Offers SafeWeb"; National Underwriter Property & Casualty; Aug. 16, 1999; p. 14; vol. 103, No. 33; USA.
"The Check Is On The Net"; USA Today; Aug. 4, 1999; p. 1B; vol. 17, No. 227; USA.
Marino, Joseph; "Online Bill Payment: Not If But When"; Nov. 1, 2000; 62(5) pages; vol. 15 No. 11.
Robinson, Teri; "Online Bill Payment: Ready To Break Through? Vendors hope improved . . . "; Information Week; Oct. 23, 2000, 158(3) pages; vol. 809.
Sanborn, Stephanie; "Check Still In the Mail For Electronic Billing"; InfoWorld; Sep. 25, 2000; 39(1) page; vol. 22, No. 33.
Kosmer, John; "The E-Bill Is In The Mail"; Computer Shopper; Jul. 1, 2000; 174(4) pages; vol. 20, No. 7.
O Brien, Jim; "You've Got Money!"; Computer Shopper; Jul. 1, 2000; 84(1) page; vol. 20, No. 7.
Arar Yardena, et al.; "Pay Bills Online: Pricey But Convenient"; PC World; 95(3) pages; vol. 18, No. 3.
"EBPP's Three To Watch: Bill Scanners, Now in an Expanded Capacity, Will Revolutionize Electronic Bill Presentment and Payment"; Bank Technology News; Oct. 1, 2000; pp. 54; vol. 13, No. 10.
Magid, Lawrence J.; "Services Take Bill-paying To Next Level"; Los Angeles Times; Sep. 4, 2004; pp. C3.
Kosmer, John; "PayMyBills"; Computer Shopper; Jul. 1, 2000; pp. 175.
Weinman, Aileo; "RIP: Bills"; PC/Computing; Apr. 1, 2000; pp. 46.
Aras, Yardena, et al.; "Pay Bills Online: Pricey But Convenient"; PC World; Mar. 1, 2000; pp. 95; vol. 18, No. 3.
Costa, Dan; "New Push for Paperless Payments"; Home Office Computing; Dec. 1, 1999; pp. 24; vol. 17, No. 12.
"PayTrust to Merge With PayMyBills to Push Scanning"; Wall Street Journal Europe; Aug. 24, 2000; p. 14.
Grensing-Pophal, Lin; "Pay Your Bills Online"; Apr. 1, 2000; pp. 107-114; vol. 45, No. 4.
Hersch, Warren S.; "The 1999 top 25 Executives: Deepockets"; Computer Reseller News; Nov. 15, 1999; pp. 167.
"Finance and Economics: For Whom The Bill Tolls"; Economist; Sep. 4, 1999; pp. 73 vol. 352, No. 8135.
"PayMyBills.com Offers SafeWeb"; National Underwriter; Aug. 16, 1999; pp. 14; vol. 103, No. 33.
Buyikian, Teresa; "Bill Me"; Adweek Western Advertising News; Sep. 13, 1999; pp. 3; vol. 49, No. 37.
"Reviews Roundup Toshiba Picks DGWB"; Adweek Western Advertising News; Aug. 2, 1999; pp. 8; vol. 49, No. 31.
"PayMyBills.com Web Site Opens For Business Jul. 9, 1999"; Newsbytes; Jul. 9, 1999; USA.
Greenberg, Peter S.; "Are We There Yet?—A globe-trotting pro takes a definitive look at online travel to tell us what's changed—and what's in store"; Yahoo! Internet Life; Jun. 1, 2000; pp. 122-127; vol. 6, No. 6.
Lomangino, Kevin; "Move Beyond Personal Finance Programs With Online Paperless Bill-Paying Services"; Internet Medicine: A Critical Guide; Jul. 1, 2000; pp. 10-11; vol. 5, No. 7.
"Paytrust, PayMyBills Team To Spur EBP&P: With An Extra $20 Million To Spend, The New Combined Company Sees Bright Future"; Future Banker; Dec. 1, 2000; pp. 49; vol. 4, No. 10.
Laise, Eleanor; "Payment E-nclosed"; Ladies Home Journal; Oct. 1, 2000; pp. 64; vol. 117, No. 10.
"Bill Payment by Internet"; Economist (US); Sep. 4, 1999; pp. 73; vol. 352, No. 8135.
Davis, Kristin; "Empty Mailbox"; Kiplinger's Personal Finance Magazine; Jun. 1, 2000; pp. 96; vol. 54, No. 6.
"Talk, Talk, Talk, Making It Easy, One Way or Another, You will Pay for It"; Newsweek; Aug. 30, 1999; pp. 66.
"Key Trade Online Debuts, Partners with EarthLink"; Dec. 21, 1999; pp. 0226.
"SF Interactive Wins PayMyBills.com Interactive Business"; PR Newswire; Dec. 16, 1999; pp. 2856; San Francisco, California, USA.
"EarthLink & Sprint Go Broadband Big Time With Go.com's ABCNEWS.com and ESPN.com FOXNews.com, FOXSports.com and ZDNet"; Business Wire; Dec. 16, 1999; pp. 0035; Pasadena, California, USA.
"PayMyBills.com and BeyondWork.com Team Up to Provide WorkSite Bill Management Service"; Dec. 9, 1999; pp. 0354; Pasadena, California, USA.
"Sun-Netscape Alliance Announces New iPlanet(TM) Application Server 6.0 Software Optimized For Java(TM)2 Platform, Enterprise Edition"; PR Newswire; Dec. 6, 1999; pp. 5185; Mountain View, California, USA.
"EarthLink Relaunches "The Mall" With Leading Brands, Hot Deals, Comparison Shopping and Customization Features"; Business Wire; Nov. 23, 1999; pp. 0029.
"PayMyBills.com Selected as EarthLink's Bill Management Premiere Partner; PayMyBills.com Will Offer Its Services To EarthLink's 1.5 Million Members"; Business Wire; Nov. 8, 1999; pp. 0259; Pasadena, California, USA.
"Asher & Partners Launches WireBreak.com Ad Campaign"; PR Newswire; Nov. 3, 1999; pp. 6077.
Kill BW0160, CA-Netzero and Kill BW0226, CQN-CA-Netzero; Business Wire; Nov. 3, 1999; pp. 0233.
"NetZero Adds PayMyBills.com to Growing List of Consumer Services Offered on The ZeroPort; As the Holidays Approach, Consumers Can Be Freed From Time-Consuming Burden of Managing Bills"; Business Wire; Nov. 3, 1999; pp. 0227; Westlake Village, California; USA.
"Asher & Partners Signs PayMyBills.com"; PR Newswire; Jul. 23, 1999; pp. 7711; Los Angeles, California, USA.
"PayMyBills.com—Latest idealab! Venture—Launches New Personal Bill Management Company With Strategic Relationships"; Business Wire; Jul. 8, 1999; Pasadena, California, USA.
"PayMyBills.com to Increase Confidence in Online Financial Transactions With Safe Web Insurance From Travelers Property Casualty"; Business Wire; Jul. 8, 1999; Pasadena, California, USA.

"Will Merger Pay Off for Bill Payers?"; Financial Service ONLINE; Oct. 2000; p. 8; vol. 5, No. 10; USA.

OR 217-31 Paytrust Completes PayMyBills Merger, Raises $20m Annotated Title—Online Bill Manager Paytrust has Completed Acquisition of PayMyBills.com; Paytrust Plans To Revamp Its E-Bill Service For Small Businesses; Online Reporter; Oct. 9, 2000; USA.

Power, Carol; "Citi Jumps into Online Bill Presentation"; American Banker; Oct. 16, 2000; p. 1; vol. 165, No. 198; USA.

"Princeton, N.J.—Based Online Bill Payment Firm Buys California Rival"; Star-Ledger; Aug. 23, 2000; USA.

"PayMyBills.com agrees to a merger with PayTrust to better promote service"; Wall Street Journal; Aug. 23, 2000; p. B4; vol. CCXXXVI, No. 37; USA.

"Paytrust, PayMyBills Join Forces"; USA Today; Aug. 23, 2000; p. 1B; vol. 18, No. 242; USA.

Toonkel, Jessica; "Paytrust's Next Hurdle: Signing Up Banks"; American Banker; Aug. 7, 2000; p. 1; vol. 165, No. 150; USA.

"In Brief: Web Benefits Firm, Paytrust Have Deal"; American Banker; Jun. 15, 2000; p. 13; vol. 165, No. 115; USA.

"OR 198-36 Paytrust, Netpliance Team Up on E-Bills"; Online Reporter; May 22, 2000; USA.

"OR 195-37 Paytrust IPO Killed"Online Reporter; May 1, 2000; USA.

"Paytrust, Edocs In Alliance"; Credit Union Journal; Apr. 17, 2000; p. 16; vol. IV, No. 16; Princeton, New Jersey, USA.

"NextCard and Paytrust.com announce alliance"; Cards International; May 31, 2000; p. 3; Ireland.

"OR 188-25 Paytrust Gets Citigroup Investment, Files for IPO"; Online Reporter; May 31, 2000; USA.

"Bill Pay Service Offers Freebies"; Financial NetNews; Jan. 17, 2000; p. 4; vol. V, No. 3; USA.

"OR 181-05 First Union Sues PayTrust.com"; Online Reporter; Jan. 24, 2000; USA.

Spirrison, J. Bradley; "Paytrust Goes Strategic for Bill Payment"; Private Equity Week; Dec. 20, 1999; USA.

"Paytrust.com Bolsters E-Billing Service"; Online Reporter; Nov. 15, 1999; USA.

Trombly, Maria; "Banks Join Forces With Online Account Aggregators"; Computerworld; Nov. 13, 2000; pp. 10.

Null, Christopher; "Deathmatch: Bill-Payment Services"; Ziff Davis Smart Business for the New Economy; Jan. 1, 2001; pp. 40.

Robinson, Teri; "Bill Presentment and Payment—Time To E-Pay The Bill—Bill Presentment May Jump-Start E-bill Paying, But Can It Also Boost E-commerce As Its Proponents Claim?"; InternetWeek; Oct. 23; pp. 67.

Marlin, Steven; "Industry Moving To Control Data Aggregation"; Bank Systems + Technology; Aug. 1, 2000; pp. 10; vol. 37, No. 8.

Ayers, Leslie; "Banking Service: Paytrust"; PC/Computing; Nov. 1, 1999; pp. 80.

"On the Move"; Adweek Eastern Edition; Dec. 22, 2000; pp. 74; vol. 41, No. 50.

Lomangino, Kevin; "Move Beyond Personal Finance Programs With Online Paperless Bill-Paying Services"; Internet Medicine: A Crtitcal Guide; pp. 10-11; vol. 5, No. 7.

"NetLedger, and Paytrust Partner to Deliver Online Bill Payment Capability"; Business Wire; Dec. 19, 2000; pp. 0083; San Mateo, California, USA.

"Eveypath Evolves Paytrust's Mobile Application From HTML to XML"; Business Wire; Dec. 19, 2000; pp. 2023; San Jose, California, USA.

"SmartMoney.com and Paytrust Launch the SmartMoney Bill Center"; Business Wire; Nov. 14, 2000; pp. 2242.

Citibank Launches Citibank Bill Manager, A Complete Online Bill Management Service; Bill Payment and Presentment Services Provided Through Paytrust; Business Wire; Oct. 12, 2000; pp. 2467.

"Paytrust and PayMyBills.com Finalize Merger"; Business Wire; Oct. 4, 2000; pp. 0104.

"vJungle and Paytrust Partner to Offer Integrated Bill Management Service for Small- to-Mid-Sized Businesses"; Business Wire; Oct. 3, 2000; pp. 2310.

"MyGovClub.com Forms Alliance With Paytrust(R) to Offer Bill Management Service for Government and Military Families"; PR Newswire; Jul. 13, 2000; Herndon, Virginia, USA.

"Paytrust and Princeton eCom Announce Alliance to Expand E-Billing and Payment Capabilities; Partnership Expands Princeton eCom's Distribution Network"; Business Wire; Jul. 12, 2000; pp. 2245; Princeton, New Jersey, USA.

"Paytrust Partners with Yodlee.com to Extend its Bill Management Service to Yodlee Co-Brands"; Business Wire; Jun. 20, 2000; pp. 2336.

"Paytrust(R) Trusts Faxgate for E-business Client Authorization"; PR Newswire; Jun. 19, 2000; pp. 1589; Stillwater, Oklahoma, USA.

"Paytrust and Netpliance Align to Launch Instant Bill Delivery and Payment on i-opener"; Business Wire; May 17, 2000; pp. 0065.

"Paytrust and Derivion Form Alliance to Accelerate Adoption of E-Billing"; Business Wire; May 2, 2000; pp. 1568.

"Everypath Launches Application Service For The Wireless Web; With More Than 30 Signed Customers, Everypath Takes Leadership Position Away From More Established Players"; Business Wire; Apr. 5, 2000; pp. 0079; Los Angeles, California, USA.

"Paytrust.com Offers Wireless Bill Delivery and Payment Service; Customers Can Now Access The Paytrust Bill Center through Their Palm VII"; Business Wire; Mar. 21, 2000; pp. 1135; Princeton, New Jersey, USA.

"Freeshop.com Adds 40 New Clients Including Investor's Business Daily, Furniture.com and Paytrust(TM)"; PR Newswire; Jan. 20, 2000; pp. 5860; Seattle, Washington, USA.

"Citibank Launches Online Payment Service For Cardholders"; CardFAX; Oct. 13, 2000; pp. 1; vol. 2000, No. 197.

"EBPP's Three To Watch: Bill Scanners, Now in an Expanded Capacity, Will Revolutionize Electronic Bill Presentment and Payment"; Bank Technology News; Oct. 1, 2000; pp. 54; vol. 13, No. 10; American Banker-Bond Buyer.

Lamond, Keith; "Credit Card Transactions Real World and Online"; www.virtualschool.edu; 1996; 16 pages.

* cited by examiner

C1. PAYER APPROVES INVOICE DECISION:
PAYER AUTHORIZES INVOICE

PAYER APPROVES BY CLICKING ON INVOICE APPROVAL BUTTON ON WEB SCREEN.
INTERMEDIARY UPDATES PAYER STATUS ON BILLER'S AND PAYER'S INVOICE
REPORTS ON INTERMEDIARY WEB SCREENS

NOTE: BASED ON A CONTRACT WITH INTERMEDIARY ALREADY SIGNED BY
PAYER, THIS PROCESS RESULTS IN A LEGAL COMMITMENT BY THE PAYER
TO PAY THE INVOICE AMOUNT ELECTRONICALLY SUCH AS
VIA A PREAUTHORIZED ACH DEBIT

400

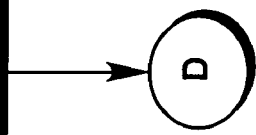

FIG. 4a

C2. PAYER INVOICE DECISION:
PAYER REJECTS INVOICE

INTERMEDIARY INFORMS BILLER, FOR BILLER TO FOLLOW UP WITH PAYER. INTERMEDIARY FLAGS INVOICE AS REJECTED ON BILLER AND PAYER INVOICE REPORT. BILLER FOLLOWS THEIR NORMAL INVOICE REJECTED PROCEDURES

405

C3. PAYER INVOICE DECISION:
PAYER DELAYS INVOICE DECISION

INTERMEDIARY COMMUNICATES NOTICES TO PAYER, ON A SCHEDULE DETERMINED BY BILLER, REQUESTING INVOICE APPROVAL. INTERMEDIARY ALSO COMMUNICATES INVOICE STATUS TO BILLER. INTERMEDIARY COMMUNICATION IS VIA WEB, EMAIL, FAX PHONE OR OTHER MEDIA AVAILABLE AT THE TIME.

410

C4. PAYER INVOICE DECISION: PAYER WANTS TO CHANGE INVOICE AMOUNT

C4.1 PAYER SENDS NOTICE TO BILLER. BILLER AND PAYER NEGOTIATE (USING INTERMEDIARY'S ELECTRONIC COMMUNICATIONS OR OTHER MEANS) INVOICE AMOUNT AND BILLER ENTERS REVISED INVOICE — 415 → (C)

C4.2 SUBJECT TO ADVANCE APPROVAL ON BILLER'S PART, PAYER MAY CHANGE INVOICE AMOUNT DIRECTLY ON INTERMEDIARY'S WEB SCREEN AND INTERMEDIARY'S COMMUNICATES REVISED AMOUNT TO BILLER — 420 → (D)

FIG. 4d

D. INTERMEDIARY PROCESSING OF INVOICES APPROVED BY PAYER (Payer agrees to pay and has funds)

| 500 | | 505 | | 510 |
|---|---|---|---|---|
| INTERMEDIARY INITIATES A PAYMENT FOR THE INVOICE AMOUNT TO BILLER'S BANK ACCOUNT (VIA ELECTRONIC FUNDS TRANSFER SUCH AS AN ACH CREDIT) FROM INTERMEDIARY'S BANK ACCOUNT WITHIN 24 HOURS OF PAYER APPROVAL. INTERMEDIARY CALCULATES A DISCOUNT PERCENTAGE BASED ON THE INVOICE AMOUNT FOR PROVIDING THE SERVICE. THIS DISCOUNT IS COLLECTED AT MONTH END AS A LUMP SUM FROM THE BILLER TO AID IN RECONCILIATION. | → | WHEN THE TIME APPROACHES FOR PAYMENT BY PAYER, INTERMEDIARY SENDS A SCHEDULED REMINDER NOTICE TO PAYER THAT THE INVOICE AMOUNT WILL BE WITHDRAWN ON DATE AGREED TO BY PAYER | → | 60 DAYS AFTER INVOICE DATE, OR SUCH OTHER DATES AS AGREED TO BY PAYER, INTERMEDIARY TRANSFERS THE INVOICE AMOUNT FROM PAYER BANK ACCOUNT TO INTERMEDIARY BANK ACCOUNT VIA ELECTRONIC FUNDS TRANSFER SUCH AS ACH DEBIT |

FIG. 5

SYSTEM AND METHOD FOR INVOICE CONFIRMATION AND FUNDING

The present application claims the benefit of U.S. provisional application No. 60/167,449, entitled "INVOICE CONFIRMATION AND FUNDING SYSTEM", filed Nov. 23, 1999.

FIELD OF THE INVENTION

The present invention relates to a system and method for billers and payers to manage accounts receivable for business-to-business payments using a third-party intermediary.

BACKGROUND OF THE INVENTION

I. Introduction

Accounts receivable are handled today primarily using manual systems with fragmented processes and procedures surrounded by ad-hoc credit, uncollected finance charges, and inflexible terms.

The biller typically mails an invoice to the payer who responds by sending a check in the mail back to the biller. There is no specified date for the payer to authorize payment and then to pay. Payers typically pay around 30 days or so after receipt of invoice but there are no hard and fast rules. Some payers pay later, which leads to problems between biller and payers. Payers may not have the money at the time billers are insisting on payment, and sometimes this leads to comments such as "the check is in the mail" by the payer. Billers will frequently assess a finance charge if payment is not received within a stated time period, but this charge is usually not enforced. Collection procedures by billers usually involve phone calls and messages to payers and are unpleasant for both the biller and the payer, particularly where there is a client relationship at stake.

Some billers, in an attempt to collect receivables sooner, along with some payers who want a price discount, will agree to terms, such as 2% 10/net 30. This means the biller provides a 2% discount on the invoice amount if paid in 10 days, with no discount if paid in 30 days. Practically speaking, the biller usually does not receive funds within 10 days, given the time it takes to receive the check in the mail, make the deposit, and then have funds available, particularly for out-of-town checks.

II. Description of Related Art

At present, there are a variety of business-to-business payment systems to choose from, including: credit cards, factoring, the electronic funds transfer ("EFT") system, the Trade Acceptance Draft ("TAD") system, and electronic bill payment services.

A. Credit Cards

Some businesses take credit cards for payment by other businesses. The biller, in return for paying a discount percentage on sales (typically 2 to 3%) to the credit card company, gets cash in several days from the credit card company, while the payer typically has 20 to 30 days to pay the credit card company. Many companies, however, don't have or accept credit cards and some billers don't want to ask for credit card payment since it indicates they don't trust the payer. Furthermore, payers prefer the flexibility to delay payment past 30 days without a fee, which is not an option with credit cards.

For credit card companies, another drawback with credit cards is the lack of a nonrepudiable commitment by the payer to pay the amount of a bill to the intermediary (i.e., the credit card company) in the future. A nonrepudiable commitment is a promise by a promisor (e.g., a payer) to a promisee (e.g., a financial intermediary) to perform an act (e.g., to pay the intermediary) on a future date specified by a contract between them, where the promise cannot be denied unless the promise was obtained by fraud. In practice, there may also be a small window of time after the nonrepudiable commitment is made where the promisor can cancel the commitment, for example where the commitment was made by mistakenly activating the wrong button on a computer. The lack of a nonrepudiable commitment is also a major drawback for a biller because a payer can refuse to pay a bill to the credit card company, which may result in the biller experiencing a charge back and not getting paid. The present invention overcomes this drawback by having the payer sign an agreement with the intermediary in which he agrees to pay the amount of any invoice he directly authorizes the intermediary to pay, thereby eliminating the possibility of the payer later denying his obligation to pay the intermediary.

Yet another drawback of a credit card system is that if a payer cannot pay the third-party intermediary, the intermediary experiences a financial loss and/or must send the account to collection, which has a negative impact on the intermediary's revenue. The present invention overcomes this limitation by having billers sign a legally binding agreement in which they agree to pay the third-party intermediary the amount of an invoice if the invoice is not paid by the payer, which significantly reduces the intermediary's possibility of loss due to nonpayment of an invoice.

B. Factoring

Some biller businesses with significant short term needs for cash will use a factoring company to factor their accounts receivable. This means the business turns over all or a portion of its receivables to the factoring company in return for getting cash from the factor company. The amount of cash is based on the receivables amount less a discount percentage, typically in the 5% to 20% range based on the nature of the industry and the quality of receivables. The factoring company then also has the responsibility to collect on outstanding receivables, and this essentially places the factoring company in an adversarial relationship with the customer of the biller and the biller loses control of the customer relationship for receivables.

In the factoring system, billers are often required to sign up all their customers to a system in which another company does invoicing and serves as the collection agency to settle disputes regarding payment. The biller typically gets 75% to 80% of their invoice amounts up front and the remainder once the invoice is paid by the payer. Payers typically have 30 days to pay invoices. The factoring system is similar to credit cards in its limitations and shortcomings concerning the nonrepudiable commitment to pay an invoice. The payer does not make a nonrepudiable commitment to pay the third-party intermediary.

C. EFT

A few business-to-business payments are also conducted via electronic funds transfer using the Automated Clearing House ("ACH"), primarily recurring payments that are paid on a regular schedule and with an amount that does not vary over time. There are systems, which enable business-to-business transfers via the ACH. These systems primarily replicate payments mailed through the post office, with the advantage that payments are made on particular dates. These systems do not provide funding, nor do they provide an automated system for receivables management including automated invoicing, collections, and financing terms.

D. TAD

The TAD system, described in U.S. Pat. No. 5,694,552, is a financial process in which financial instruments called Trade Acceptance Drafts are bought and sold. Sellers endorse TADs, which are sent to a financial organization that purchases the TADs from the sellers. Once the financial organization purchases the TAD, the financial organization pays a major percentage of the purchase price to the seller. Unlike the present invention, where billers and payers sign payment agreements only with the third-party intermediary, in the TAD system buyers and sellers are required to execute bilateral agreements with all trading partners, which makes the system very cumbersome. Furthermore, with TAD, the intermediary does not directly receive the commitment to pay. Rather, the biller receives the commitment and transfers it to the intermediary. This adds to the cumbersome nature of the TAD system.

E. Electronic Bill Payment Services

With electronic bill payment services, members sign up to have their bills paid by a third-party intermediary system. Unlike the present invention, where payers are allowed a float in paying the amount of the bill to the third-party intermediary, in the electronic bill payment services collection from the payer and payment to the biller is simultaneous, i.e., the payer is not given a "float."

SUMMARY OF THE INVENTION

In one embodiment, the present invention is a method for payment of an invoice evidencing a payment obligation of a payer to a biller using a third-party intermediary, including receiving at the intermediary a nonrepudiable commitment from the payer to pay the amount of an invoice that is directly authorized by the payer, wherein the commitment includes a payment date subsequent to such authorization; receiving from the biller a legally binding commitment to pay the amount of the invoice that is directly authorized by the payer to the intermediary if the payer does not pay the amount of such an invoice to the intermediary; receiving at the intermediary directly from the payer an authorization to pay the amount of the invoice to the biller; after receiving directly the authorization, paying to the biller at least a substantial portion of the amount of the invoice; and subsequently collecting from the payer (or the payer's agent) the amount of the invoice.

In another embodiment, the invention is an apparatus for facilitating payment of an invoice evidencing a payment obligation of a payer to a biller using a third-party intermediary, comprising: a) a storage device; and b) a processor connected to the storage device, the storage device storing a program for controlling the processor; and the processor operative with the program to: 1) receive at the intermediary a nonrepudiable commitment from the payer to pay the amount of any invoice that is directly authorized by the payer, wherein the commitment includes a payment date subsequent to such authorization; 2) receive from the biller a legally binding commitment to pay the amount of any invoice that is directly authorized by the payer to the intermediary if the payer does not pay the amount of such an invoice to the intermediary; 3) receive at the intermediary directly from the payer an authorization to pay the amount of the invoice to the biller; 4) after receiving directly the authorization, pay to the biller a substantial portion of the amount of the invoice; and 5) subsequently collect from the payer (or the payer's agent) the amount of the invoice.

The present invention is an automated system for managing accounts receivable for both billers and payers via a third-party intermediary. The system for management of accounts receivable includes automated invoicing, funding, and collections. The system uses the Internet for initiating, approving and collecting invoices, and uses electronic funds transfer (e.g., via ACH) for debits and credits to biller and payer bank accounts for funding and payment. The system also uses the Internet and other communications media to keep billers, payers, and the third-party intermediary informed of the payment procedures being adhered to, payment status and financing options, terms and charges. The system and method enable billers to get paid quickly and payers to pay later. Billers get paid within 10 days while providing a service to payers. Payers pay in 60 days without cost or vendor hassle.

The system is controlled by billers and payers through the Internet, providing an alternative or supplement to credit cards, 2% 10 net 30, and other receivables alternatives. Both billers and payers have the flexibility to decide which invoices to process with the system and associated terms for payment and collections.

Billers enter the invoice amount on the Internet and are paid by the third-party intermediary as soon as the payer approves the invoice on the Internet. The intermediary obtains payment from the payer typically 60 days after the invoice date. Payments to both billers and payers are typically made using electronic funds transfer and the commitment to invoice and pay is typically made electronically.

In addition to providing an automated system, the intermediary also provides funding through a funding partner that provides the float needed to make the system work properly. The intermediary typically has also automated the debit/credit of funds from the funding partner using electronic funds transfer.

The present invention is unique and superior to the prior systems because it contains the following combination of transaction characteristics:

Nonrepudiability—With the present invention, the payer makes a legal commitment to the intermediary to pay the amount of any invoice that the payer directly authorizes the intermediary to pay. For a given invoice, the payer commits to pay the intermediary at some time after the direct authorization is made (e.g., sixty days after authorization). This commitment occurs well in advance of the actual payment by the payer.

Dual recourse—The biller makes a legal commitment to the intermediary to pay the agreed upon invoice amount if the payer defaults.

True intermediary—Billers and payers only need to sign payment agreements with the third-party intermediary. Buyers and sellers are not required to execute bilateral agreements with all of their trading partners.

Direct authorization—Payers authorize payment directly with the intermediary.

The benefits provided by the present invention include:

The biller gets paid within 2-3 days after the payer commits to pay the invoice amount.

Both sides of the transaction are registered users of the system, and each can look up the status of any transaction between them at any time using the Web, initiate new invoices and payments, negotiate payment revisions, and authorize and cancel invoices and payments.

Optional payment terms are offered to 1) the payer who decides not to pay on time (e.g., within 60 days), and 2) the biller who decides not to pay immediately in event of a payer default.

Collection terms are written and collections are also implemented electronically.

Comprehensive reporting provides the status of all receivables in the system, both current month and year to date.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 4a is a flowchart illustrating an exemplary method for a payer to authorize an invoice.

FIG. 4d is a flowchart illustrating an exemplary method for a payer to change an invoice amount.

FIG. 5 is a flowchart illustrating an exemplary method for an intermediary to process invoices approved by a payer.

FIG. 10b is a flowchart illustrating an exemplary method for payer reporting

DETAILED DESCRIPTION OF THE PREFERRED EMBODIMENT

I. System and Method Overview

Figure 1A:
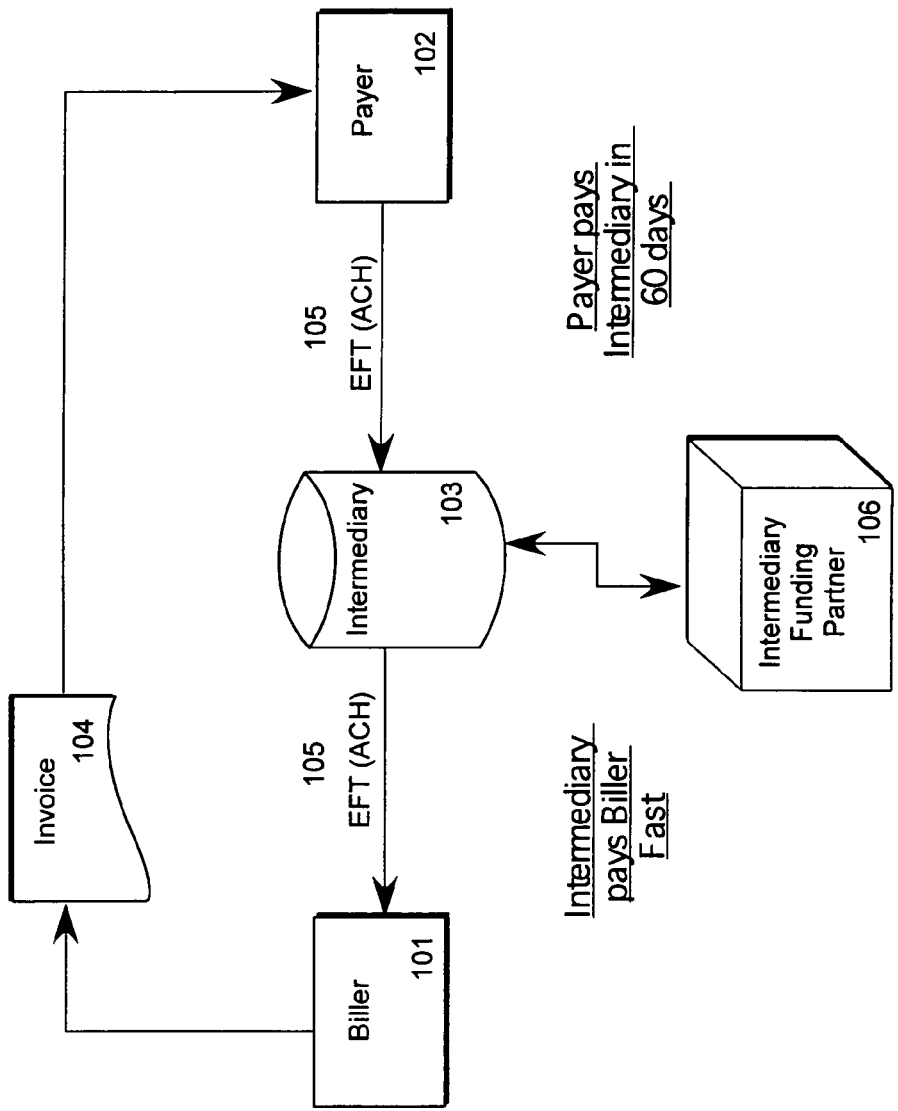
FIG. 1a is a schematic illustrating an exemplary system for invoice confirmation and funding.

FIG. 1a is an overview of an exemplary invoice confirmation and funding system. This system involves a Biller 101, a Payer 102, a third-party intermediary 103, an invoice 104, and an electronic funds transfer system (e.g., ACH) 105. The Biller 101, Payer 102, and third-party intermediary 103 will typically have their own corresponding computers, which can be communicatively coupled to each other over a network (e.g., the Internet). These computers have the components found in any standard computer (e.g., a processor, a storage device, software programs on a computer-readable medium, and a display) and need not be described in greater detail here because their use, functionality and interrelation will be readily apparent to those of ordinary skill in the art.

Figure 1B:
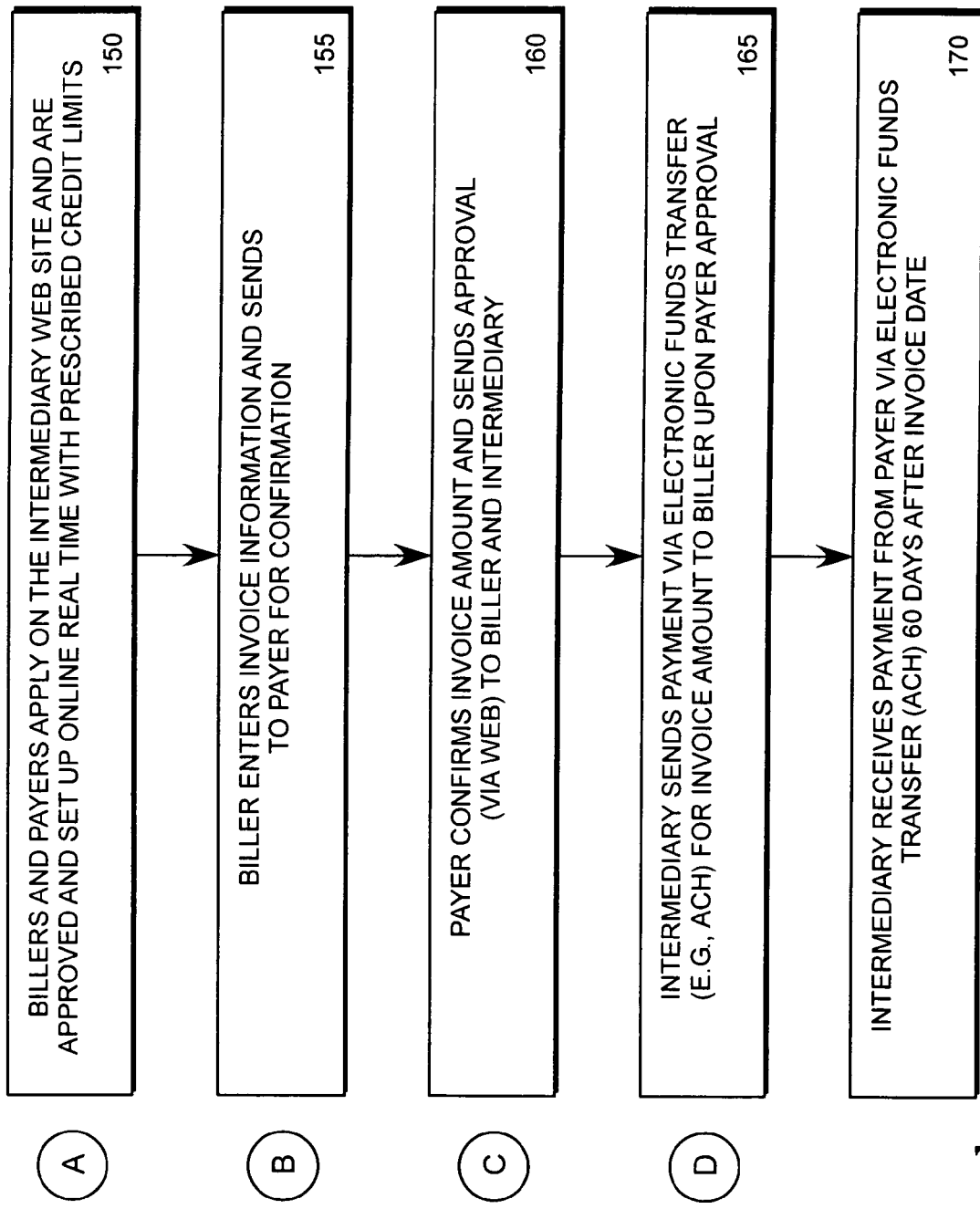
FIG. 1b is a flowchart illustrating an exemplary method for invoice confirmation and funding.

In FIG. 1b, at step 150, Biller 101 and Payer 102 apply on the website of the third-party intermediary 103. In his application, the Biller 101 agrees to a legally binding commitment to pay the amount of any invoice 104 that is directly authorized by the payer 102 to the intermediary 103 if the payer 102 does not pay the amount of such an invoice 104 to the intermediary 103. In his application, the Payer 102 gives the third-party intermediary 103 authorization to pay the amount of an invoice 104 submitted by the Biller 101 to the third-party intermediary 103 in the future, provided the Payer 102 gives his direct authorization to the intermediary 103 to pay the invoice 104. Payer 102 also gives a nonrepudiable commitment to the intermediary 103 to pay the amount of any invoice 104 that is directly authorized by the payer. For a given invoice 104, Payer 102 commits to pay the intermediary 103 at some time after the direct authorization is made (e.g., sixty days after authorization). Both Biller 101 and Payer 102 are typically approved and set-up online in real time with prescribed credit limits.

At step 155, the Biller 101 sends an invoice 104 to third-party intermediary 103, who receives the invoice 104 via the web or other means. The third-party intermediary 103 notifies Payer 102 of invoice 104 to get confirmation. At step 160, Payer 102 confirms invoice 104 by directly sending authorization to the third-party intermediary 103 to pay the amount of the invoice 104 to the Biller 101. At step 165, after receiving authorization directly from Payer 102, third-party intermediary 103 sends via electronic funds transfer (e.g., ACH) 105 or other means, payment for a substantial amount of the authorized total of the authorized invoice 104 to Biller 101. At step 170, third-party intermediary 103 receives payment from Payer 102 of the amount of the invoice 104 via electronic funds transfer (e.g., ACH) 105, typically 60 days after the invoice date.

II. Application Set-Up

Figure 2A:
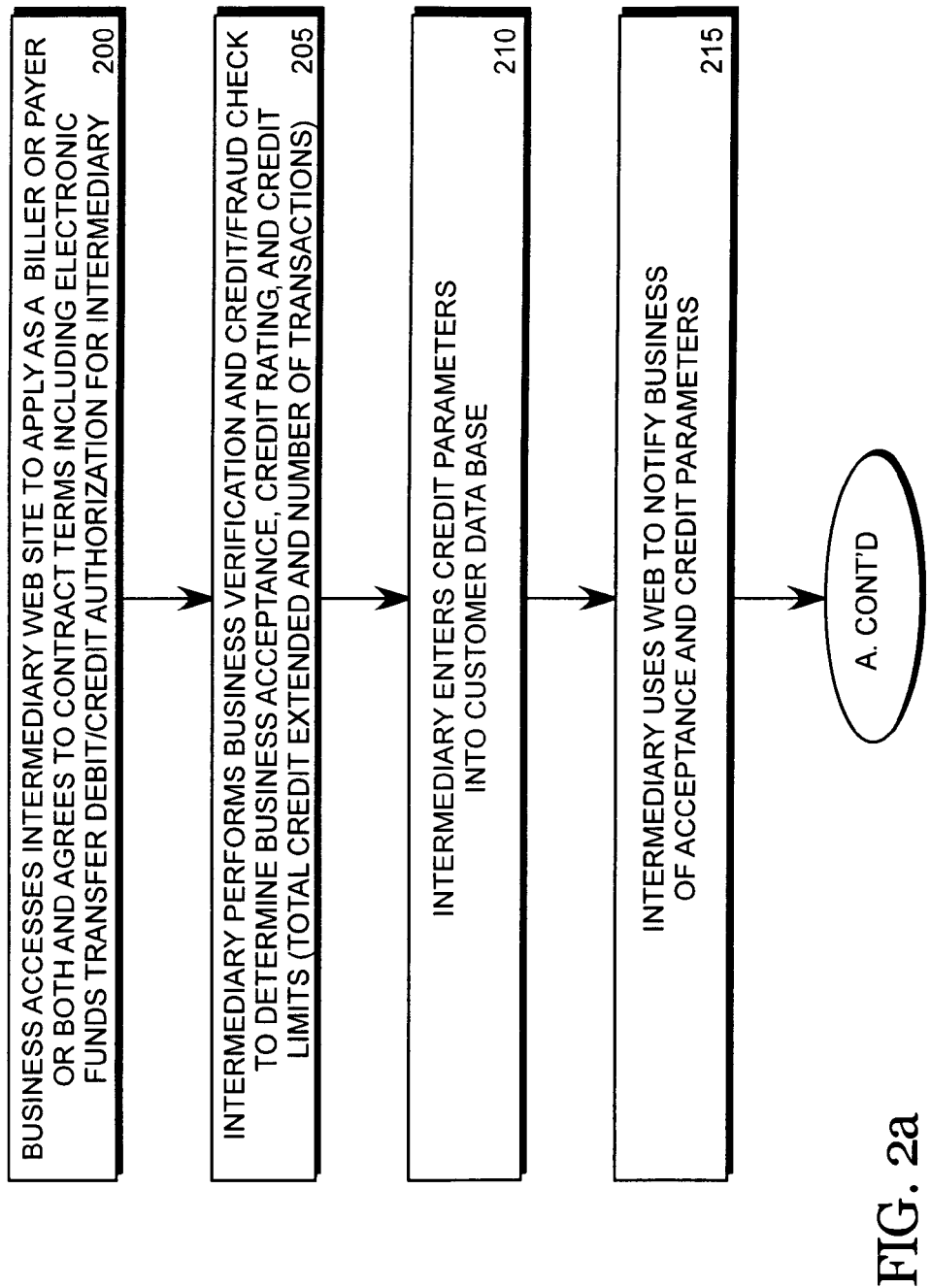
FIG. 2a and FIG. 2b are flowcharts illustrating an exemplary application/set-up method.

FIG. 2a illustrates the application set-up process (A) in more detail. At step 200, a business applies to be either a Biller 101 or a Payer 102 or both via the web or other means. The business agrees to contract terms with the intermediary 103, including electronic funds transfer debit/credit authorization for the third-party intermediary 103. At step 205, third-party intermediary 103 performs a business verification and credit/fraud check to determine business acceptance, credit rating and credit limit. At step 210, credit parameters for the business are entered in a customer data-base. At step 215, third-party intermediary 103 notifies the business of acceptance and credit parameters via the web or other means.

Figure 2B:
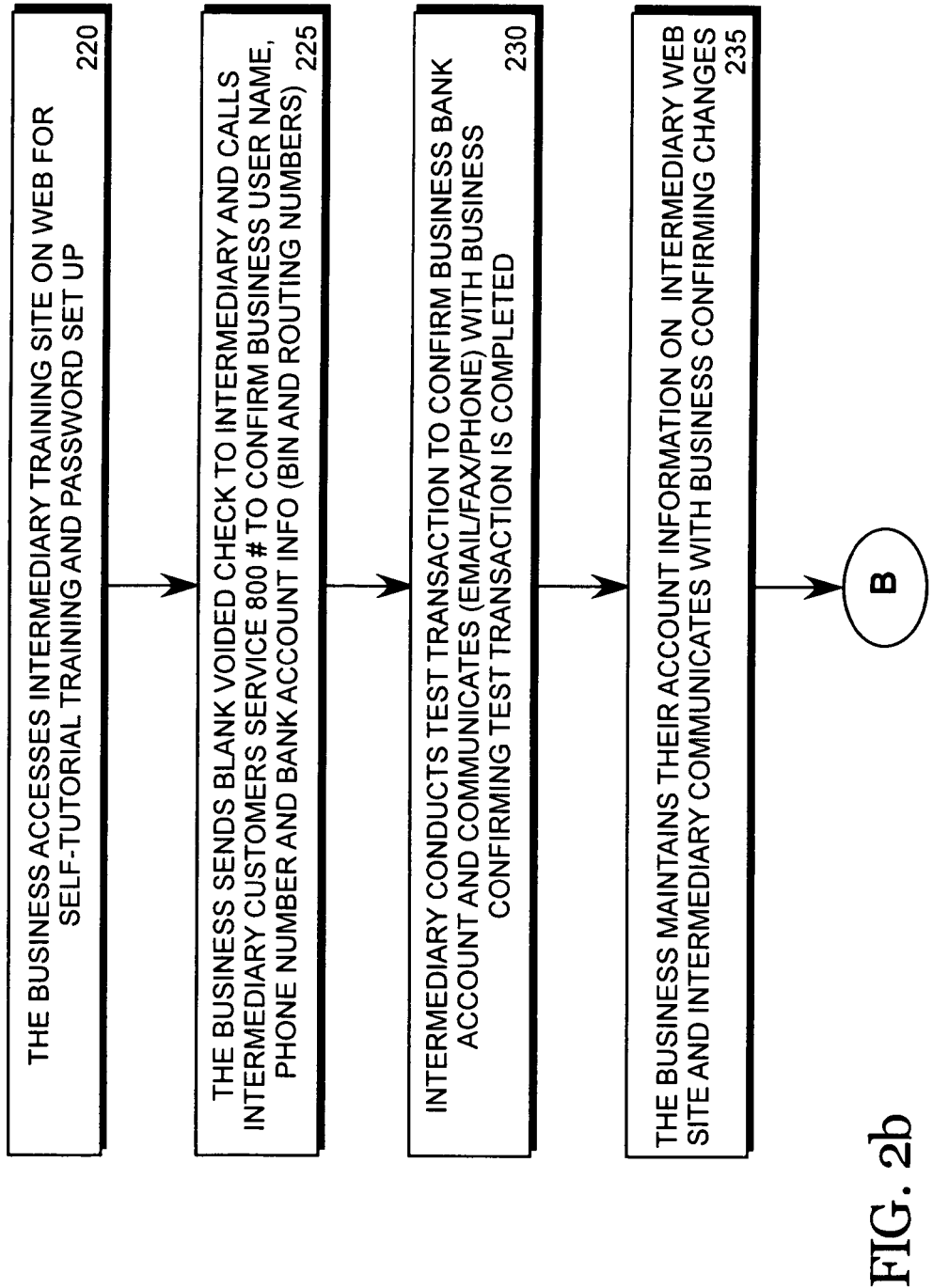

FIG. 2b continues to illustrate the application set-up process in more detail. At step 220, the business accesses third-party intermediary 103 training site on the web for self-tutorial training and password set-up. At step 225, the business sends a blank voided check to third-party intermediary 103 and calls third-party intermediary's 103 customer service telephone number to confirm the business user name, phone number and bank account information (e.g., BIN and routing numbers). At step 230, third-party intermediary 103 conducts a test transaction to confirm the business bank account and communicates via email/fax/phone with the business to confirm that the test transaction is completed. At step 235, the business maintains their account information on third-party intermediary 103 web site and third-party intermediary 103 communicates with the business to confirm any changes.

III. Biller Invoicing

Figure 3:
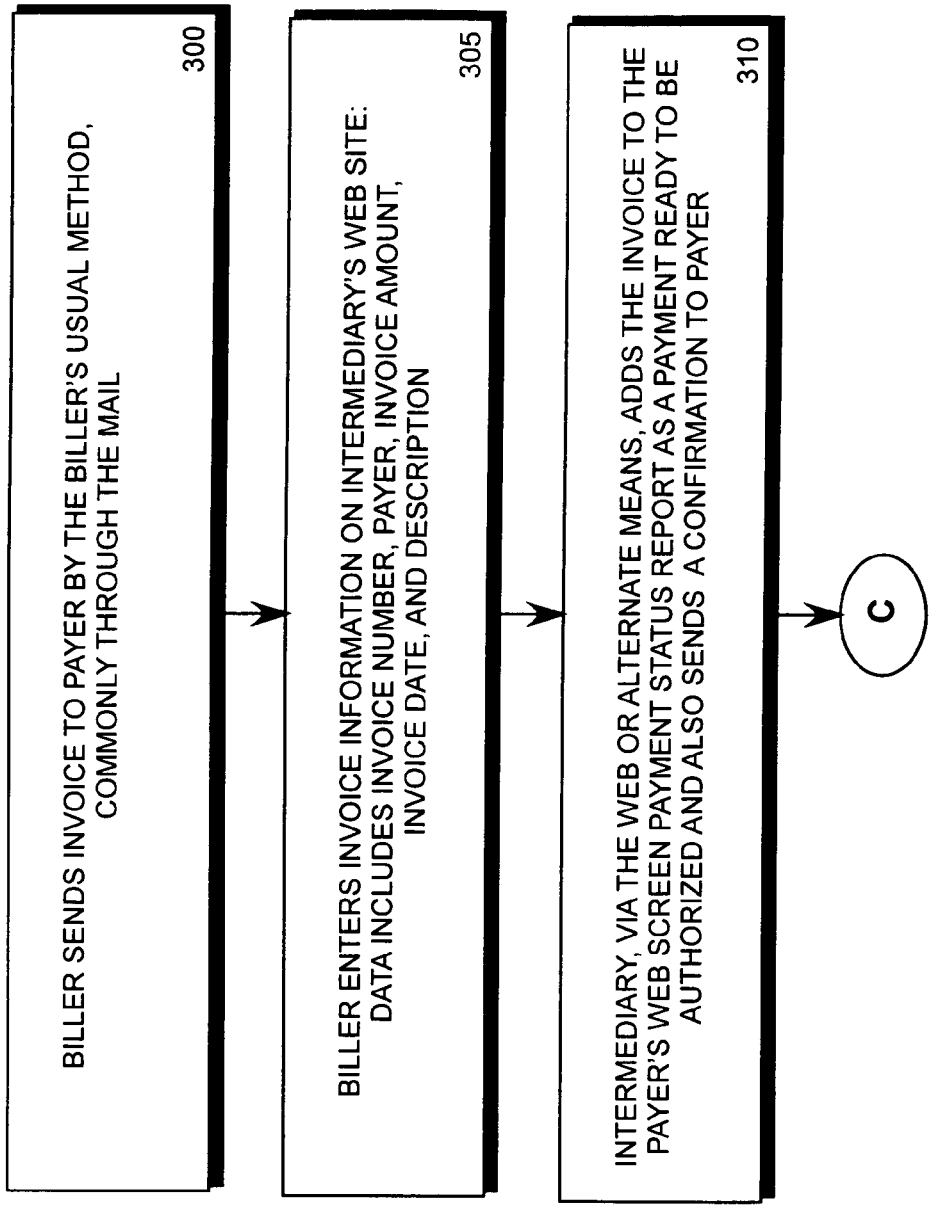
FIG. 3 is a flowchart illustrating an exemplary method for billers to initiate invoices.

FIG. 3 illustrates invoicing initiated by Biller 101. At step 300, Biller 101 sends invoice 104 to Payer 102 by Biller's 101 usual method, commonly through the mail. At step 305, Biller 101 sends invoice 104 information to the third-party intermediary 103, typically to the third-party intermediary's website. The invoice typically includes an invoice number, Payer 102, invoice amount, invoice date and description. At step 310, third-party intermediary 103 notifies Payer 102 of invoice 104 by adding invoice 104 to the Payer 102 web screen payment status report as a payment ready to be authorized and also sends a confirmation to Payer 102.

IV. Payer Invoice Options

Figure 4:
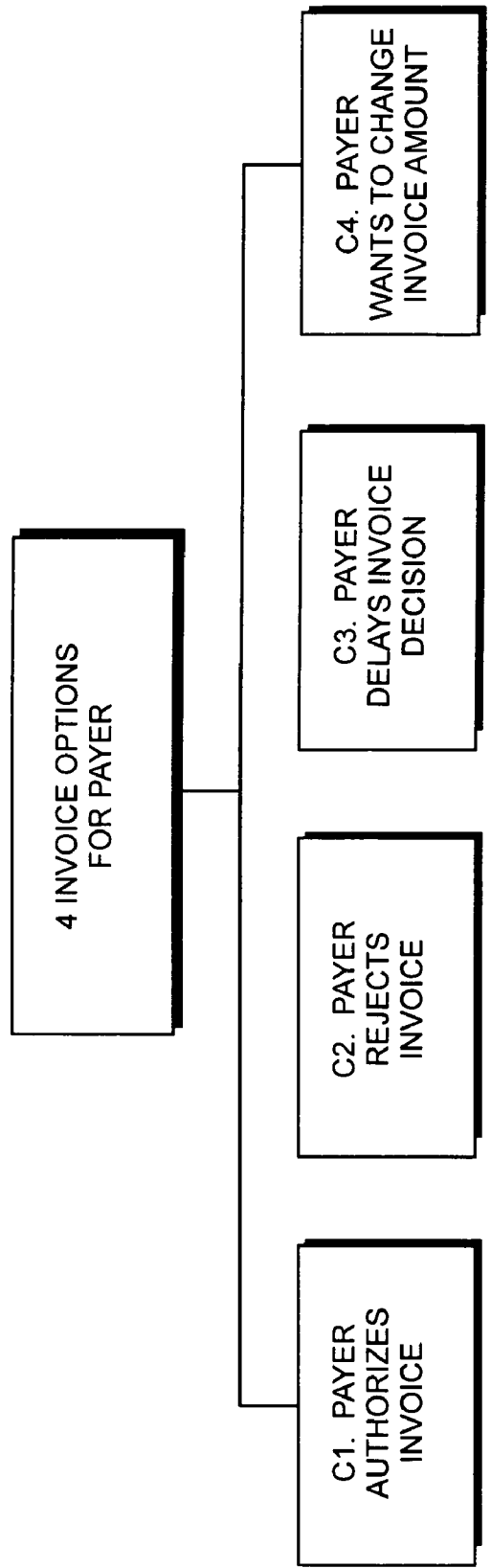
FIG. 4 is a flowchart illustrating four invoice options given to a payer.

FIG. 4 illustrates four (4) Payer 102 invoice options: Payer 102 authorizes invoice; Payer 102 rejects invoice; Payer 102 delays invoice decision; or Payer 102 wants to change invoice amount.

FIG. 4a illustrates a Payer 102 authorizing an invoice. At step 400, Payer 102 approves invoice 104, for example by clicking on an invoice approval button on an intermediary web screen or via other means. Third party intermediary 103 updates Payer 102 status on Biller's 101 and Payer's 102 invoice reports on third-party intermediary 103 web screens or via other means. The contract agreed to by Payer 102 and intermediary 103 in the application setup process creates a nonrepudiable commitment to pay the intermediary 103 in the future (e.g., via a pre-authorized ACH debit, a paper check or any other traditional payment method) when the Payer 102 directly authorizes payment of the invoice 104 in step 400.

Figure 4B:
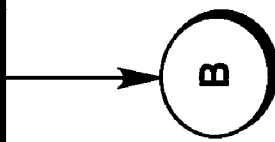
FIG. 4b is a flowchart illustrating an exemplary method for a payer to reject an invoice.

FIG. 4b illustrates a Payer 102 rejecting an invoice. At step 405, third-party intermediary 103 informs Biller 101 of the rejection and suggests that Biller 101 follow-up with Payer 102. Third party intermediary 103 flags invoice 104 as rejected on Biller 101 and Payer 102 invoice 104 report. Biller 101 follows his normal invoice rejected procedures.

Figure 4C:
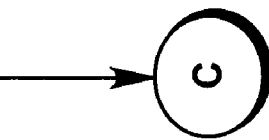
FIG. 4c is a flowchart illustrating an exemplary method for a payer to delay an invoice decision.

FIG. 4c illustrates a Payer 102 delaying invoice decision. At step 410, third-party intermediary 103 communicates notices to Payer 102, on a schedule determined by Biller 101, requesting invoice 104 approval. Third-party intermediary 103 also communicates invoice status to Biller 101. This communication is via web, email, fax, phone or other media available at the time.

FIG. 4d illustrates a Payer wanting to change an invoice amount. At step 415, Payer 102 sends notice to Biller 101. Biller 101 and Payer 102 negotiate (using third-party intermediary's electronic communication or via other means) the invoice 104 amount and Biller 101 enters a revised invoice 104. At step 420, Payer 102 and Biller 101 may agree on a different amount via the web or other means. Subject to advance approval by Biller 101, Payer 102 may change the invoice amount directly on intermediary 103 web screen. For this case, intermediary 103 will then communicate the revised amount to Biller 101.

V. Processing Approved Invoices

FIG. 5 illustrates third-party intermediary 103 processing of invoices 104 approved by Payer 102. At step 500, after Payer 102 approval, third-party intermediary 103 initiates a payment for the invoice 104 amount to Biller's 101 bank account via electronic funds transfer (such as an ACH credit) or other means (such as a paper check) from third-party intermediary's 103 bank account. Third party intermediary 103 calculates a discount percentage based on the invoice 104 amount for providing the service. This discount can be collected as a lump sum from the Biller 101 to aid in reconciliation. At step 505, when the time approaches for payment by Payer 102, third-party intermediary 103 sends a scheduled reminder notice to Payer 102 that the invoice 104 amount will be withdrawn on the date agreed to by Payer 102. At step 510, typically 60 days after the invoice date, or such other dates as agreed to by Payer 102, third-party intermediary 103 transfers the invoice amount from Payer 102 bank account to third-party intermediary 103 bank account via electronic funds transfer (such as an ACH debit), or collects money via other means (such as a paper check).

VI. Exception Processing

Figure 6:
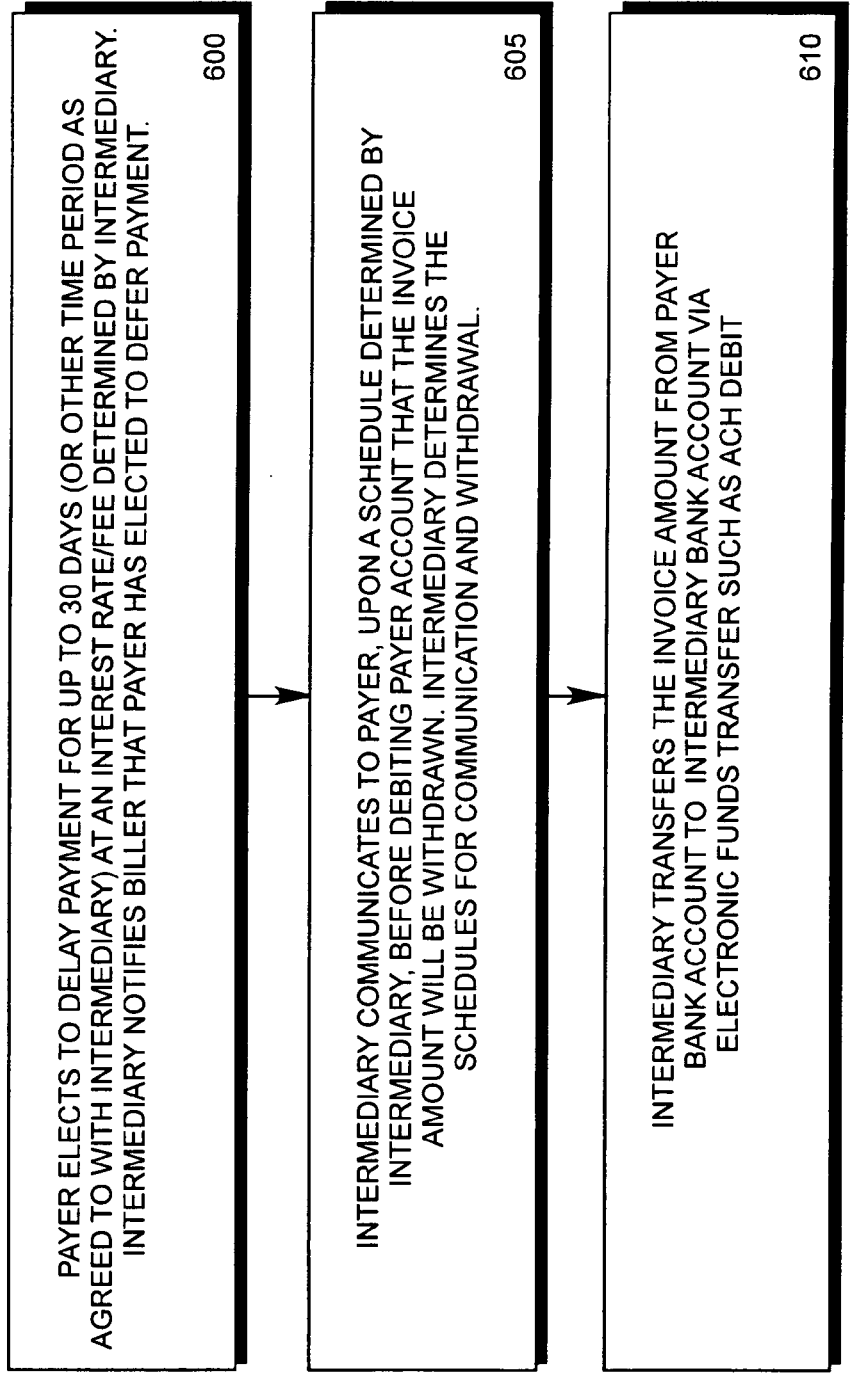
FIG. 6 is a flowchart illustrating an exemplary method for the exception processing of invoices in which a payer requests a delay in payment to the intermediary.

FIG. 6 illustrates exception processing when Payer 102 requests a delay in payment to third-party intermediary 103. At step 600, Payer 102 elects to delay payment for up to 30 days (or other time period as agreed to with third-party intermediary 103) at an interest rate/fee determined by third-party intermediary 103. Third party intermediary 103 notifies Biller 101 that Payer 102 has elected to defer payment. At step 605, third-party intermediary 103 communicates to Payer 102, upon a schedule determined by third-party intermediary 103, before debiting Payer 102 account, that the invoice 104 amount will be withdrawn. Third party intermediary 103 determines the schedules for communication and withdrawal. At step 610, third-party intermediary 103 transfers the invoice 104 amount from Payer 102 bank account to third-party intermediary 103 bank account via electronic funds transfer (such as an ACH debit) or other means (such as a paper check).

Figure 7:
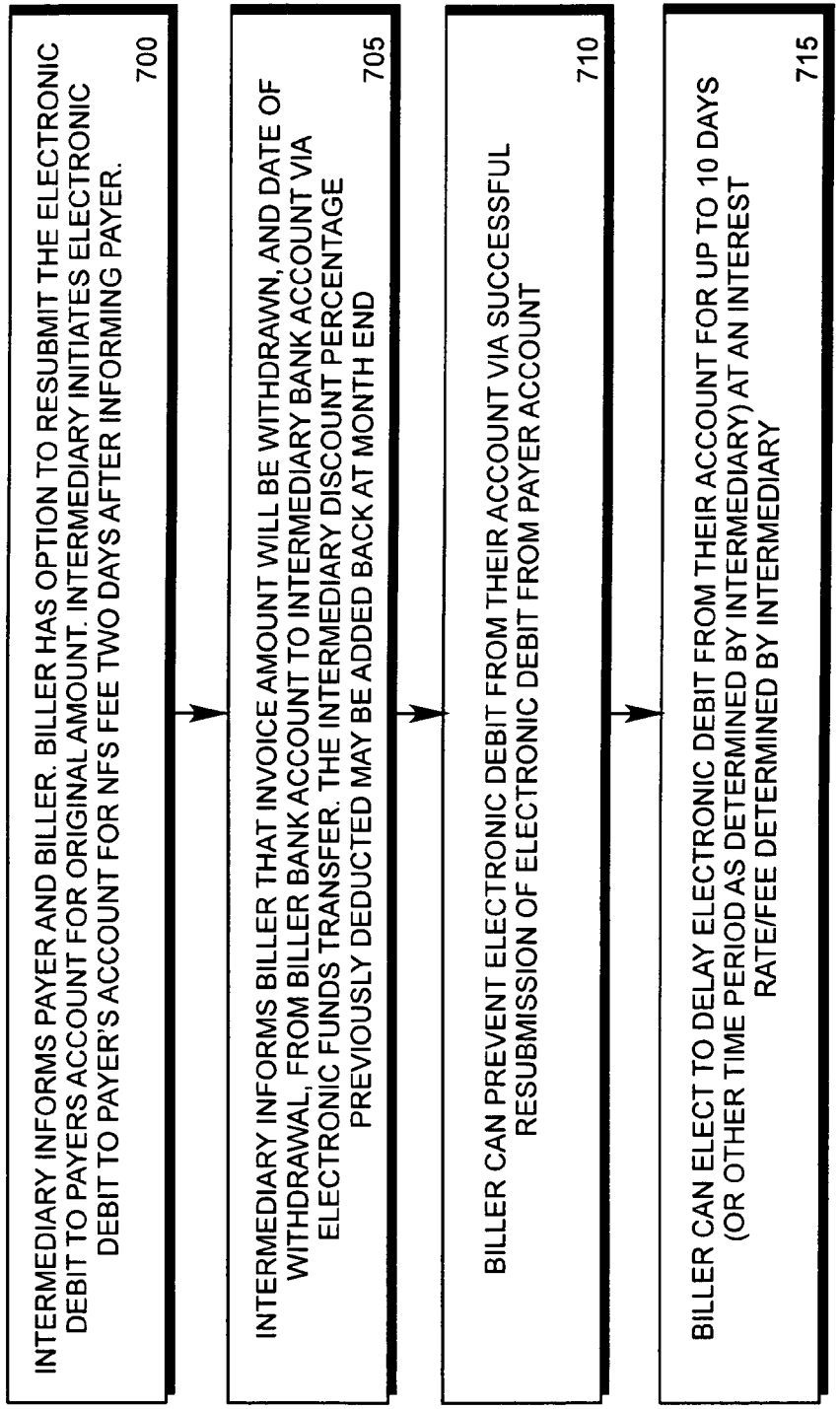
FIG. 7 is a flowchart illustrating an exemplary method for the exception processing of invoices in which a payer does not have sufficient funds to allow for withdrawal by the intermediary.

FIG. 7 illustrates exception processing when the Payer 102 does not have sufficient funds in his bank account to allow withdrawal by third-party intermediary 103. At step 700, third-party intermediary 103 informs Payer 102 and Biller 101 of NSF (non-sufficient funds). Biller 101 has the option to resubmit the electronic debit to Payer's 102 account for the original amount. Third party intermediary 103 initiates an electronic debit to Payer's 102 account for a NSF fee after informing Payer 102. At step 705, third-party intermediary 103 informs Biller 101 that invoice amount will be withdrawn, and date of withdrawal, from Biller 101 bank account to third-party intermediary 103 bank account via electronic funds transfer or other means (such as a paper check). The third-party intermediary 103 discount percentage previously deducted may be added back at month end. At step 710, Biller 101 can prevent electronic debit from his account via successful resubmission of electronic debit from Payer 102 account or other means (such as a paper check). At step 715, Biller 101 can elect to delay electronic debit from their account for up to ten (10) days (or other time period determined by third-party intermediary 103) at an interest rate/fee determined by third-party intermediary 103.

Figure 8:
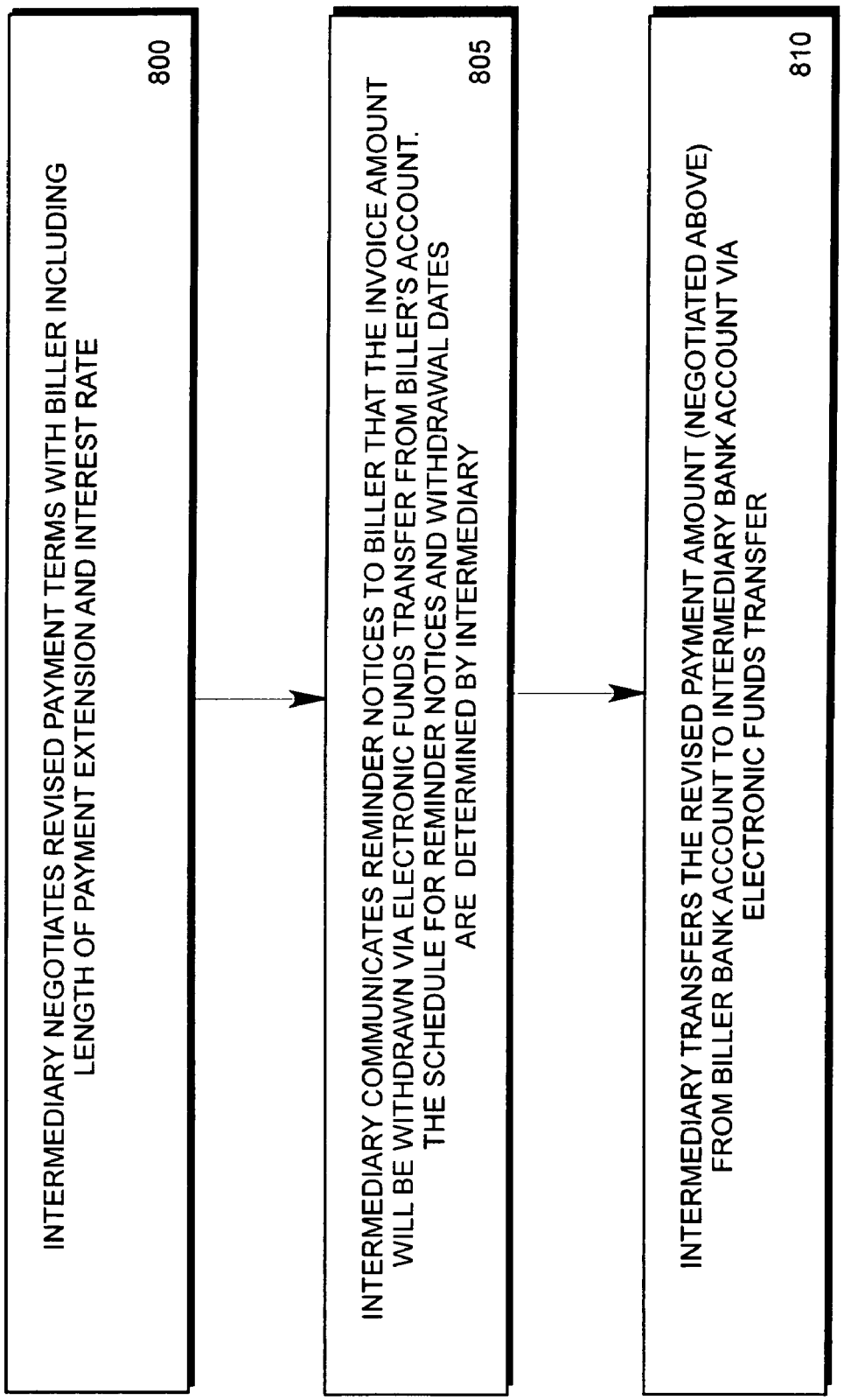
FIG. 8 is a flowchart illustrating an exemplary method for the exception processing of invoices in which a biller does not have sufficient funds to allow for withdrawal by the intermediary.

FIG. 8 illustrates exception processing when the Biller 101 has non-sufficient funds. In step 800, third-party intermediary 103 negotiates revised payment terms with Biller 101 including length of payment extension and interest rate. At step 805, third-party intermediary 103 communicates reminder notices to Biller 101 that the invoice 104 amount will be withdrawn via electronic funds transfer or other means (such as a paper check) from Biller's 101 account. The schedule for reminder notices and withdrawal dates are determined by third-party intermediary 103. At step 810, third-party intermediary 103 transfers the revised payment amount (negotiated above) from Biller 101 bank account to third-party intermediary 103 bank account via electronic funds transfer or by other means (such as a paper check).

Figure 9:
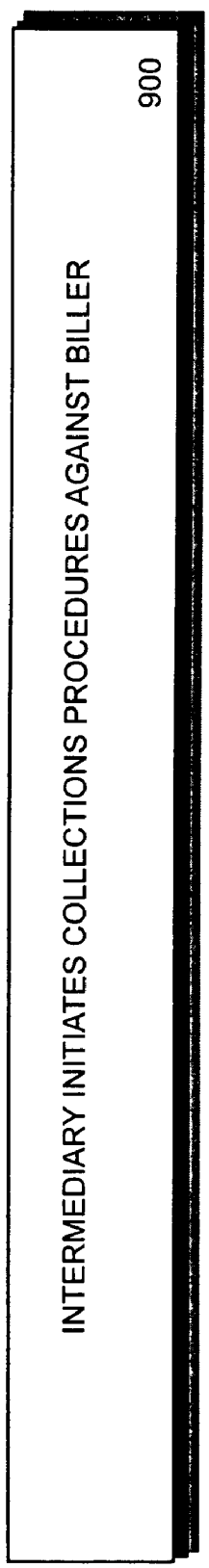
FIG. 9 is a flowchart illustrating an exemplary method for the exception processing of invoices in which a biller defaults to the intermediary.

FIG. 9 illustrates exception processing when Biller 101 defaults. At step 900, third-party intermediary 103 initiates collections procedures against Biller 101 or Payer 102.

VII. Third Party Intermediary System Functions

Figure 10A:
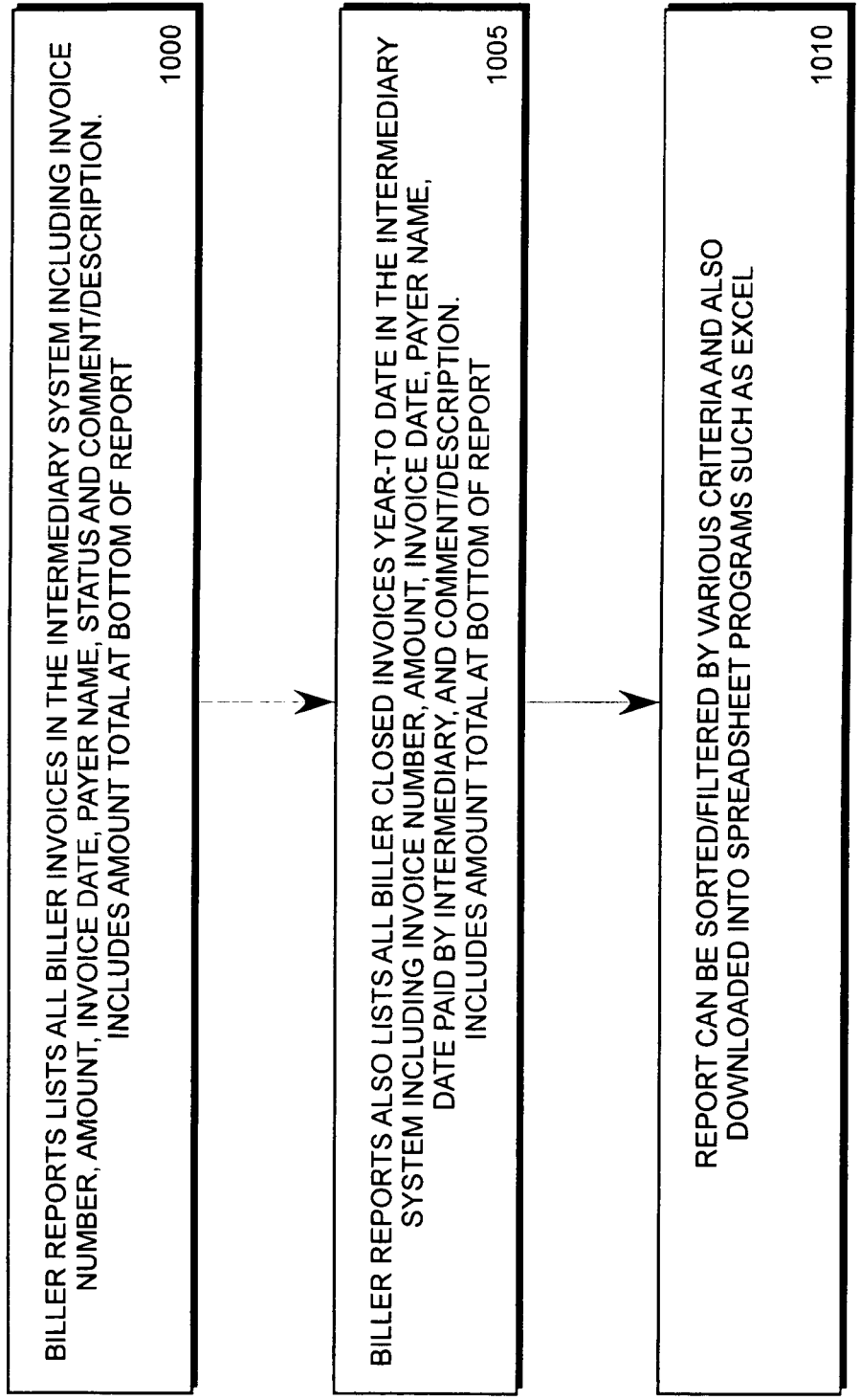
FIG. 10a is a flowchart illustrating an exemplary method for biller reporting.
Figure 1O:
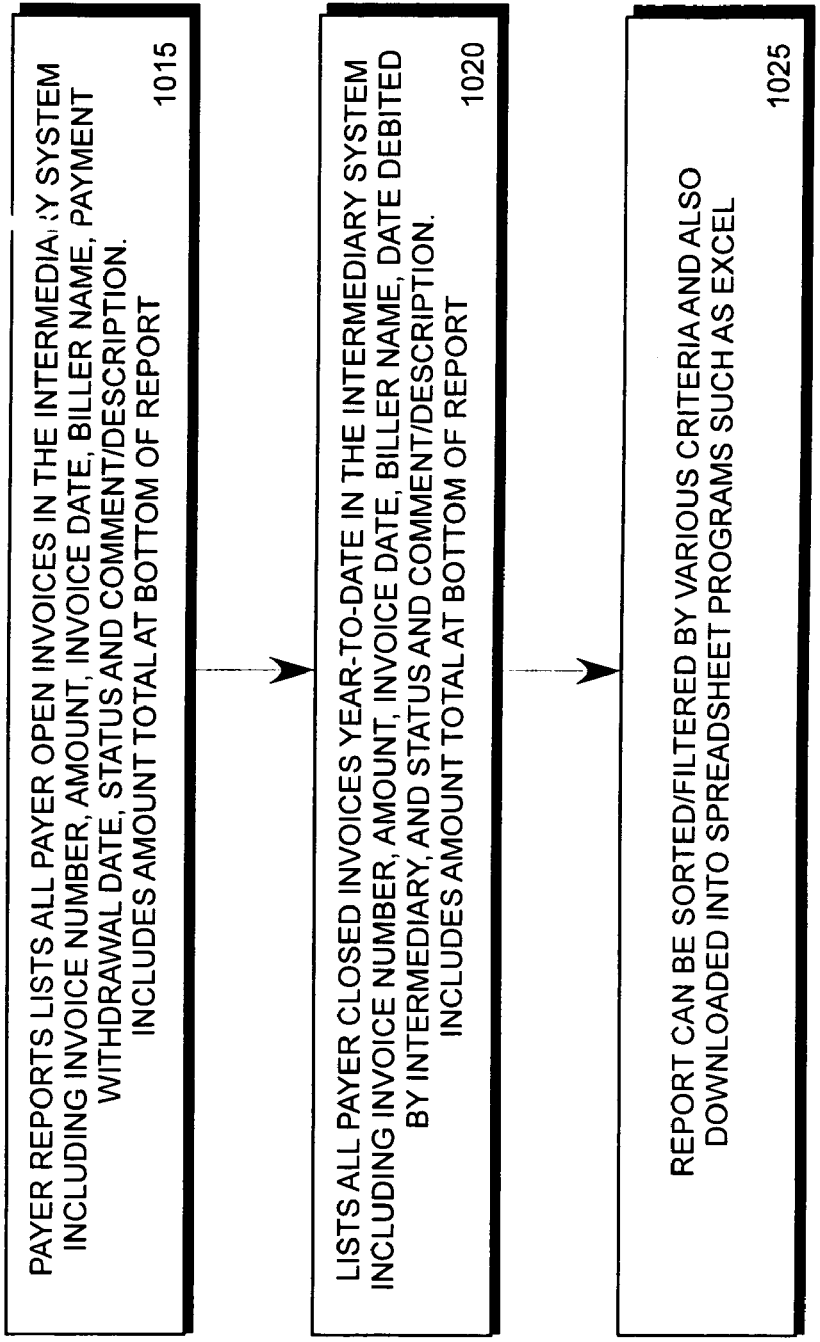

FIG. 10a illustrates the third-party intermediary 103 system function of Biller reporting. At step 1000, Biller report lists all Biller 101 open invoices 104 in the third-party intermediary 103 system. The Biller report typically includes an invoice number, amount, and invoice date, Payer name, status, comment/description, and total amount of Biller 101 open invoices 104. At step 1005, Biller report also lists all Biller 101 closed invoices year-to-date in the third-party intermediary 103 system. The closed invoices listed in the Biller report typically include an invoice number, amount, invoice date, payer name, date paid by third-party intermediary, comment/description, and total amount of closed invoices. At step 1010, the report can be sorted/filtered by various criteria and also downloaded into spreadsheet programs such as Excel.

FIG. 10b illustrates the third-party intermediary 103 system function of Payer 102 reporting. At step 1015, Payer 102 report lists all Payer 102 open invoices 104 in the third-party intermediary 103 system. The Payer report typically includes an invoice number, amount, invoice date, Biller name, payment withdrawal date, status, comment/description, and amount total. At step 1020, Payer 102 report lists all Payer 102 closed invoices year-to-date in the third-party intermediary 103 system. The closed invoices listed in the Payer report typically include an invoice number, amount, invoice date, Biller 101 name, date debited by third-party intermediary, comment/description, and amount total. At step 1025, the report can be sorted/filtered by various criteria and also downloaded into spreadsheet programs such as Excel.

Figure 10C:
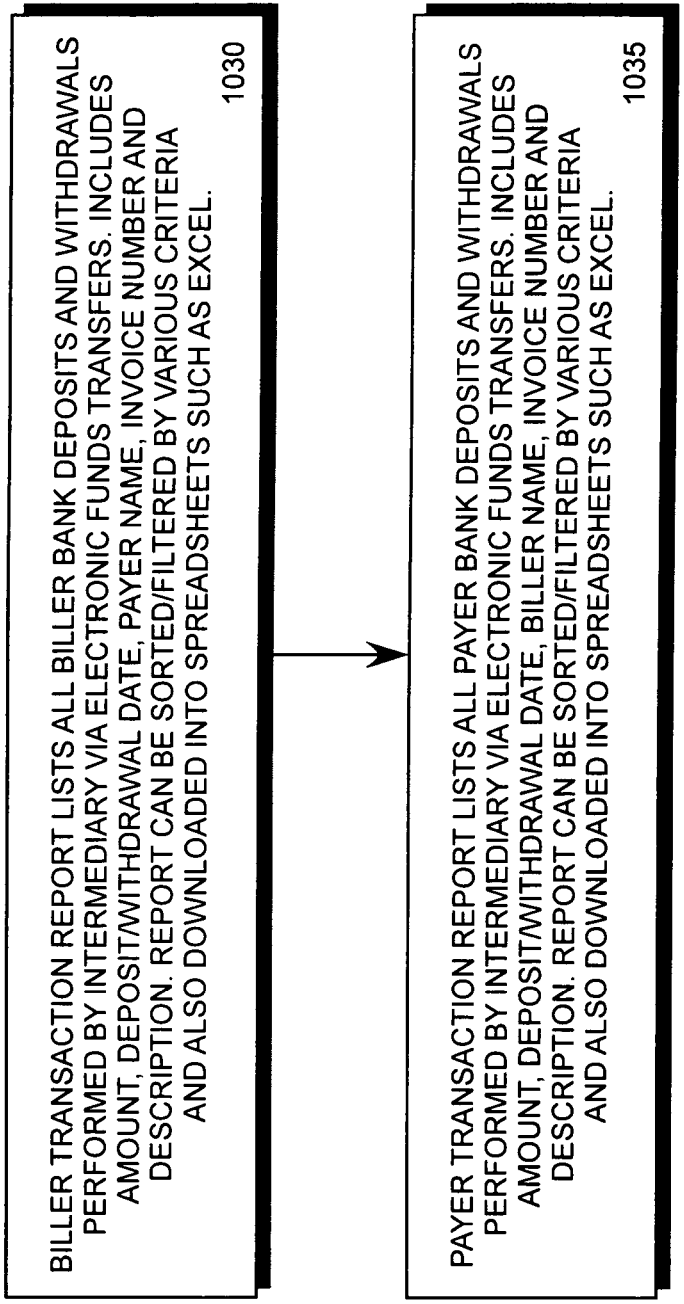
FIG. 10c is a flowchart illustrating an exemplary method for transaction reporting

FIG. 10c illustrates the third-party intermediary 103 system function of transaction reporting. At step 1030, Biller 101 transaction report lists all Biller 101 bank deposits and withdrawals performed by third-party intermediary 103 via electronic funds transfers. It also includes amount, deposit/withdrawal date, Payer 102 name, invoice number and description. The report can be sorted/filtered by various criteria and also downloaded into spreadsheets such as Excel.

At step 1035, Payer 102 transaction report lists all Payer 102 bank deposits and withdrawals performed by third-party intermediary 103 via electronic funds transfers. The Payer 102 transaction report also includes amount, deposit/withdrawal date, Biller 101 name, invoice number and description. The report can be sorted/filtered by various criteria and also downloaded into spreadsheets such as Excel.

Figure 11:
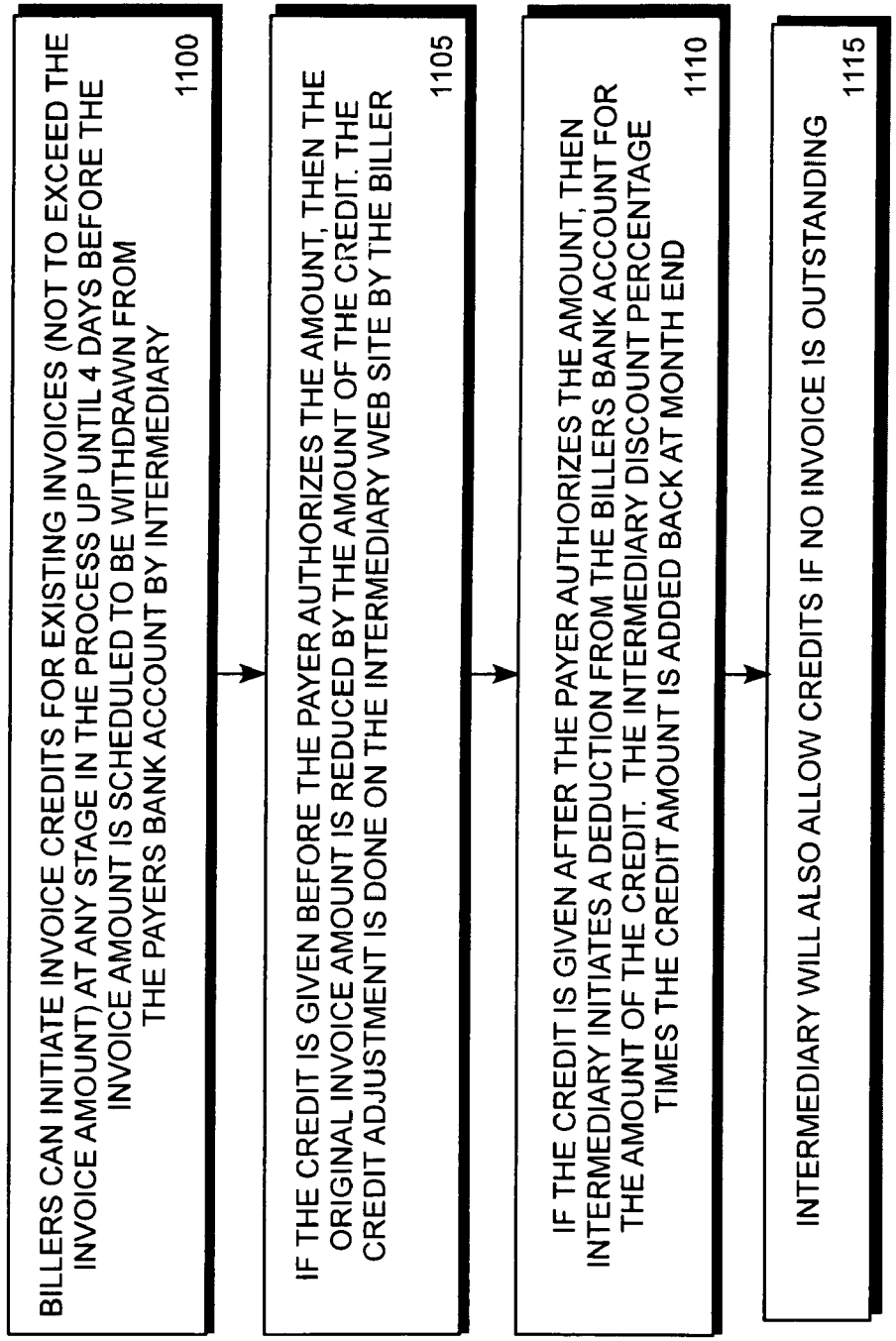
FIG. 11 is a flowchart illustrating an exemplary method for invoice credits.

FIG. 11 illustrates third-party intermediary 103 system functions concerning invoice credits. At step 1100, Billers 101 can initiate invoice credits for existing invoices (not to exceed the invoice amount) at any stage in the process up until four days before the invoice 104 amount is scheduled to be withdrawn from the Payer 102 bank account by third-party intermediary 103. At step 1105, if the credit is given before the Payer 102 authorizes the amount, then the original invoice amount is reduced by the amount of the credit. The credit adjustment is done on the third-party intermediary 103 web site by the Biller 101. At step 1110, if the credit is given after the Payer 102 authorizes the amount, then the third-party intermediary initiates a deduction from the Biller's 101 bank account for the amount of the credit. The third-party intermediary discount percentage times the credit amount is added back at month end. At step 1115, third-party intermediary 103 will also allow credits if no invoice 104 is outstanding.

Additional third-party intermediary 103 system functions may include:

1. Fraud monitoring—The system performs ongoing monitoring of both Biller 101 and Payer 102 activities from initial account application by the business through the total transaction processing cycle.
2. Integration with business accounting software—The third-party intermediary 103 system can be integrated with major business accounting software packages (including QuickBooks, Peachtree, etc.) so that third-party intermediary 103 transactions are automatically transferred to and from the accounting package without requiring duplicate entries.
3. Guaranteed payment—As an option, third-party intermediary 103 may enter into an arrangement with Biller 101 whereby third-party intermediary absorbs credit losses on Biller 101 invoices if Payer 102 defaults, as opposed to Biller 101 absorbing those losses. Third-party intermediary 103 obtains an additional discount on invoice 104 amount for taking the risk of Payer 102 default.

The various embodiments described above should be considered as merely illustrative of the present invention and not in limitation thereof. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims which follow:

What is claimed is:

1. A computer-implemented method for payment of an invoice evidencing a payment obligation of a payer to a biller using a third-party intermediary, wherein the computer-implemented method is performed by one or more computers executing one or more programs stored in their memories, the computer-implemented method comprising:

receiving at the intermediary a nonrepudiable commitment from the payer to pay an amount of an invoice that is directly authorized by the payer, wherein the commitment includes a payment date subsequent to such authorization;

receiving from the biller a legally binding commitment to pay the amount of the invoice that is directly authorized by the payer to the intermediary if the payer does not pay the amount of the invoice to the intermediary;

receiving at the intermediary directly from the payer an authorization to pay the amount of the invoice to the biller;

after directly receiving the authorization, paying to the biller at least a substantial portion of the amount of the invoice; and subsequently collecting from the payer (or at payer's agent) the amount of the invoice.

2. The method of claim 1, wherein the nonrepudiable commitment from the payer is to pay a respective amount of any invoice that is directly authorized by the payer.

3. The method of claim 1, wherein the legally binding commitment from the biller is to pay a respective amount to the intermediary of any invoice that is directly authorized by the payer if the payer does not pay the respective amount to the intermediary.

4. The method of claim 1, wherein the authorization is received electronically.

5. The method of claim 1, wherein the nonrepudiable commitment to pay comprises a commitment to pay within a predetermined period of time.

6. The method of claim 1, wherein the paying to the biller id done electronically.

7. The method of claim 1, wherein the full amount of the invoice is paid to the biller.

8. The method of claim 1, wherein the amount of the invoice is collected from the payer electronically.

9. The method of claim 1, wherein the payment obligation is not part of an explicit payment agreement that is executed between the biller and the payer apart from the invoice.

10. The method of claim 1, further comprising collecting from the biller a fee for the paying of the invoice.

11. The method of claim 1, further comprising collecting from the payer a fee for the paying of the invoice.

12. An apparatus to facilitate payment of an invoice evidencing a payment obligation of a payer to a biller using a third-party intermediary, comprising:

a storage device; and a processor connected to the storage device, the storage device storing a program for controlling the processor; and the processor operative with the program to:

receive at the intermediary a nonrepudiable commitment from the payer to pay the amount of any invoice that is directly authorized by the payer, wherein the commitment includes a payment date subsequent to such authorization;

receive from the biller a legally binding commitment to pay the amount of the invoice that is directly authorized by the payer to the intermediary if the payer does not pay the amount of such an invoice to the intermediary;

receive at the intermediary directly from the payer an authorization to pay the amount of the invoice to the biller;

after directly receiving the authorization, pay to the biller at least a portion of the amount of the invoice; and subsequently collect form the payer (or a payer's agent) the amount of the invoice.

13. The apparatus of claim 12, wherein the nonrepudiable commitment from the payer to pay a respective amount of any invoice that is directly authorized by the payer.

14. The apparatus of claim 12, wherein the legally binding commitment from the biller is to pay a respective amount to the intermediary of any invoice that is directly authorized by the payer if the payer does not pay the respective amount to the intermediary.

15. The apparatus of claim 12, wherein the nonrepudiable commitment to pay includes a commitment to pay within a predetermined period of time.

16. The apparatus of claim 12, wherein the nonrepudiable commitment to pay includes a commitment to pay within a predetermined period of time.

17. The apparatus of claim 12, wherein the payment obligation is not part of an explicit payment agreement that is executed between the biller and the payer apart from the invoice.

18. The apparatus of claim 12, further comprising the processor operative with the program to collect from the payer a fee for paying the invoice.

19. An article of manufacturing having one or more machine-readable media storing instructions which, when executed by a machine, cause the machine to a method comprising:

receiving at the intermediary a nonrepudiable commitment from the payer to pay an amount of an invoice that is directly authorized by the payer, wherein the commitment includes a payment date subsequent to such authorization;

receiving from the biller a legally binding commitment to pay the amount of the invoice that is directly authorized by the payer to the intermediary if the payer does not pay the amount of the invoice to the intermediary;

receiving at the intermediary directly from the payer an authorization to pay the amount of the invoice to the biller;

after directly receiving the authorization, paying to the biller at least a portion of the amount of the invoice; and subsequently collecting from the payer (or payer's agent) the amount of the invoice.

* * * * *